US010275204B2

(12) United States Patent
Kim et al.

(10) Patent No.: US 10,275,204 B2
(45) Date of Patent: Apr. 30, 2019

(54) SHARING CONTENT OPERATING METHOD AND ELECTRONIC DEVICE FOR SUPPORTING THE SAME

(71) Applicant: Samsung Electronics Co., Ltd., Suwon-si, Gyeonggi-do (KR)

(72) Inventors: Sang Heon Kim, Gumi-si (KR); Jong Min Kim, Busan (KR); Jae Hwan Lee, Daegu (KR); In Hyung Jung, Gumi-si (KR); Min Ho Kim, Suwon-si (KR); Jong Wu Baek, Gumi-si (KR); Cheong Jae Lee, Daegu (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 122 days.

(21) Appl. No.: 15/257,529

(22) Filed: Sep. 6, 2016

(65) Prior Publication Data

US 2017/0139665 A1 May 18, 2017

(30) Foreign Application Priority Data

Nov. 13, 2015 (KR) .................. 10-2015-0159944

(51) Int. Cl.
*G09G 5/00* (2006.01)
*G06F 3/14* (2006.01)
(Continued)

(52) U.S. Cl.
CPC .......... *G06F 3/1454* (2013.01); *G06F 9/5022* (2013.01); *G06F 9/524* (2013.01);
(Continued)

(58) Field of Classification Search
CPC ........ G09G 5/14; G09G 1/007; G06F 3/0481; G06T 11/60; G01S 7/06
(Continued)

(56) References Cited

U.S. PATENT DOCUMENTS 7,013,191 B2 * 3/2006 Rubbert ................. G16H 50/50
700/98
7,188,309 B2 * 3/2007 Simmons .............. G06F 17/211
715/244
(Continued)

OTHER PUBLICATIONS

Game Development Stack Exchange, "How to optimize collision detection", Apr. 15, 2015, [online], [retrieved on Mar. 4, 2018]. Retrieved from the Internet <URL: https://gamedev.stackexchange.com/questions/76185/how-to-optimize-collision-detection>.*

*Primary Examiner* — Gordon G Liu
(74) *Attorney, Agent, or Firm* — Jefferson IP Law, LLP

(57) ABSTRACT

An electronic device is provided. The electronic device includes an input interface configured to receive first input information relating to a sharing content operation, a communication interface configured to receive second input information relating to the sharing content operation from at least one external electronic device, a memory configured to store at least one instruction relating to processing of the sharing content, and a processor electronically connected to the input interface, the communication interface, and the memory, where the processor, upon executing the least one instruction, is configured to determine collision occurrence possibility of the first input information and the second input information, and to apply a specified effect corresponding to the collision occurrence possibility.

18 Claims, 15 Drawing Sheets

(51) Int. Cl.
- *G06F 9/50* (2006.01)
- *G06F 9/52* (2006.01)
- *G09G 5/36* (2006.01)
- *G09G 5/377* (2006.01)
- *H04L 29/08* (2006.01)

(52) U.S. Cl.
CPC ............ *G09G 5/363* (2013.01); *G09G 5/377* (2013.01); *H04L 67/10* (2013.01)

(58) Field of Classification Search
USPC ....................................................... 345/635
See application file for complete search history.

(56) References Cited

U.S. PATENT DOCUMENTS

| | | |
|---|---|---|
| 8,417,666 B2 | 4/2013 | Bailor et al. |
| 8,473,870 B2 | 6/2013 | Hinckley et al. |
| 8,490,002 B2 | 7/2013 | Fai |
| 8,510,381 B1 | 8/2013 | Birand et al. |
| 8,521,917 B2 | 8/2013 | Durojaiye et al. |
| 2009/0327294 A1 | 12/2009 | Bailor et al. |
| 2009/0327531 A1 | 12/2009 | Durojaiye et al. |
| 2010/0191884 A1* | 7/2010 | Holenstein .......... G06F 11/2094 710/200 |
| 2011/0191695 A1* | 8/2011 | Dinka ................... G06F 3/0481 715/753 |
| 2011/0197147 A1* | 8/2011 | Fai ....................... G06F 1/1639 715/753 |
| 2011/0209103 A1 | 8/2011 | Hinckley et al. |
| 2013/0297559 A1 | 11/2013 | Bailor et al. |
| 2013/0326544 A1 | 12/2013 | Durojaiye et al. |

\* cited by examiner

SHARING CONTENT OPERATING METHOD AND ELECTRONIC DEVICE FOR SUPPORTING THE SAME

CROSS-REFERENCE TO RELATED APPLICATION(S)

This application claims the benefit under 35 U.S.C. § 119(a) of a Korean patent application filed on Nov. 13, 2015 in the Korean Intellectual Property Office and assigned Serial number 10-2015-0159944, the entire disclosure of which is hereby incorporated by reference.

TECHNICAL FIELD

The present disclosure relates to a sharing content operation.

BACKGROUND

Recent electronic devices provide various user functions and store user data relating thereto. Additionally, electronic devices may communicate with external electronic devices via networks.

The electronic devices may share a specified content while communicating with external electronic devices. Additionally, the specified content may be edited according to the inputs of the electronic devices and the external electronic devices. However, during an edit operation, collision occurs between input information inputted by an electronic device and input information inputted by an external electronic device.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a sharing content operating method for providing an appropriate content operating situation by preventing collision between input information for a shared content and an electronic device for supporting the same.

In accordance with an aspect of the present disclosure, an electronic device is provided. The electronic device includes a display, a user input device, which is integrated into the display or separated from the display, including a circuit for receiving a touch and/or gesture inputted from a user, a communication circuit, a processor electrically connected to the display, the user input device, and the communication circuit, and a memory electrically connected to the processor. The memory may store instructions executed by the processor. The processor, upon executing the least one instruction, may be configured to output a user interface of a software program on the display, to receive a first gesture inputted from the user input device, to display a first image in correspondence to a first gesture input in a first area of the user interface, to receive a second image generated from another electronic device through a communication circuit, and, when at least a part of the second image overlaps a first image, to change or move at least a part of the second image that is disposed on the first image, disposed below the first image, or separated from the first image.

In accordance with another aspect of the present disclosure, an electronic device is provided. The electronic device includes a display, a user input device, which is integrated into the display or separated from the display, including a circuit for receiving a touch and/or gesture inputted from a user, a communication circuit, a processor electrically connected to the display, the user input device, and the communication circuit, and a memory electrically connected to the processor. The memory may store instructions executed by the processor. The processor, upon executing the least one instruction, may be configured to output a user interface of a software program on the display, to receive a first gesture inputted from the user input device, to display a first image in correspondence to a first gesture input in a first area of the user interface, to receive a second image generated from another electronic device through the communication circuit, to transmit information on the first image or a part of the first image through the communication circuit, and to perform an adjustment to dispose at least a part of the second image on or below the first image, or separate at least the part of the second image from the first image.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
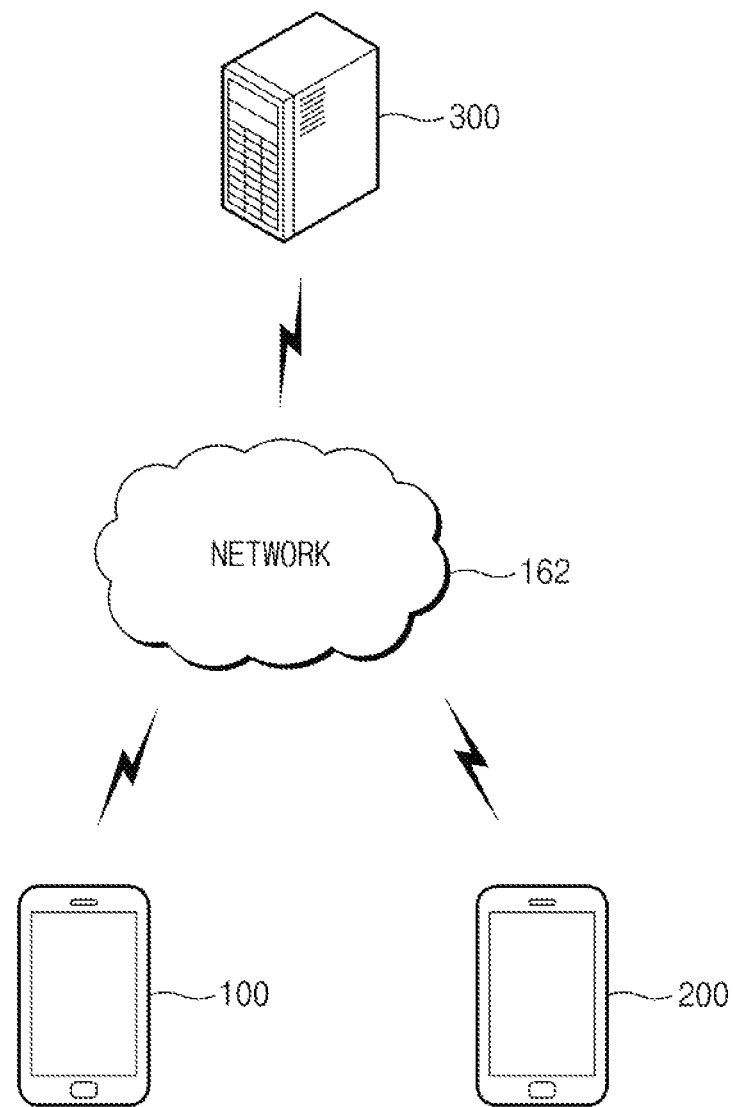
FIG. 1 is a view illustrating a sharing content operating environment according to various embodiments of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The term "include," "comprise," and "have", or "may include," or "may comprise" and "may have" used herein indicates disclosed functions, operations, or existence of elements but does not exclude other functions, operations or elements.

For instance, the expression "A or B", or "at least one of A or/and B" may indicate include A, B, or both A and B. For instance, the expression "A or B", or "at least one of A or/and B" may indicate (1) at least one A, (2) at least one B, or (3) both at least one A and at least one B.

The terms such as "1st", "2nd", "first", "second", and the like used herein may refer to modifying various different elements of various embodiments of the present disclosure, but do not limit the elements. For instance, "a first user device" and "a second user device" may indicate different users regardless of the order or the importance. For example, a first component may be referred to as a second component and vice versa without departing from the scope of the present disclosure.

In various embodiments of the present disclosure, it will be understood that when a component (for example, a first component) is referred to as being "(operatively or communicatively) coupled with/to" or "connected to" another component (for example, a second component), the component may be directly connected to the other component or connected through another component (for example, a third component). In various embodiments of the present disclosure, it will be understood that when a component (for example, a first component) is referred to as being "directly connected to" or "directly access" another component (for example, a second component), another component (for example, a third component) does not exist between the component (for example, the first component) and the other component (for example, the second component).

The expression "configured to" used in various embodiments of the present disclosure may be interchangeably used with "suitable for", "having the capacity to", "designed to", "adapted to", "made to", or "capable of" according to a situation, for example. The term "configured to" may not necessarily mean "specifically designed to" in terms of hardware. Instead, the expression "a device configured to" in some situations may mean that the device and another device or part are "capable of". For example, "a processor configured (or set) to perform A, B, and C" in a phrase may mean a dedicated processor (for example, an embedded processor) for performing a corresponding operation or a generic-purpose processor (for example, a central processing unit (CPU) or application processor (AP)) for performing corresponding operations by executing at least one software program stored in a memory device.

Otherwise indicated herein, all the terms used herein, which include technical or scientific terms, may have the same meaning that is generally understood by a person skilled in the art. In general, the terms defined in the dictionary should be considered to have the same meaning as the contextual meaning of the related art, and, unless clearly defined herein, should not be understood abnormally or as having an excessively formal meaning. In any cases, even the terms defined in this specification cannot be interpreted as excluding embodiments of the present disclosure.

According to various embodiments of the present disclosure, electronic devices may include at least one of smartphones, tablet personal computers (PCs), mobile phones, video phones, electronic book (e-book) readers, desktop PCs, laptop PCs, netbook computers, workstation server, personal digital assistants (PDAs), portable multimedia player (PMPs), Moving Picture Experts Group phase 1 or phase 2 (MPEG-1 or MPEG-2) audio layer 3 (MP3) players, mobile medical devices, cameras, and wearable devices. According to various embodiments of the present disclosure, the wearable devices may include at least one of accessory types (e.g., watches, rings, bracelets, anklets, necklaces, glasses, contact lenses, or head-mounted-devices (HMDs)), fabric or garment integrated types (for example, e-apparel), body-mounted types (for example, skin pads or tattoos), or bio-implantation types (for example, implantable circuits).

According to various embodiments of the present disclosure, an electronic device may be home appliance. The home appliance may include at least one of, for example, televisions (TVs), digital video disc (DVD) players, audios, refrigerators, air conditioners, cleaners, ovens, microwave ovens, washing machines, air cleaners, set-top boxes, home automation control panels, security control panels, TV boxes (e.g., Samsung HomeSync™, Apple TV™ or Google TV™), game consoles (for example, Xbox™ and PlayStation™), electronic dictionaries, electronic keys, camcorders, and electronic picture frames.

According to various embodiments of the present disclosure, an electronic device may include at least one of various medical devices supporting call forwarding service (for example, various portable measurement devices (for example, glucometers, heart rate meters, blood pressure meters, temperature meters, etc.), magnetic resonance angiography (MRA) devices, magnetic resonance imaging (MRI) devices, computed tomography (CT) devices, medical imaging devices, ultrasonic devices, etc.), navigation devices, global navigation satellite system (GNSS), event data recorders (EDRs), flight data recorders (FDRs), vehicle infotainment devices, marine electronic equipment (for example, marine navigation systems, gyro compasses, etc.), avionics, security equipment, vehicle head units, industrial or household robots, financial institutions' automatic teller's machines (ATMs), or stores' point of sales (POS) or Internet of things (for example, bulbs, various sensors, electric or gas meters, sprinkler systems, fire alarms, thermostats, street lights, toasters, exercise equipment, hot water tanks, heaters, boilers, etc.).

In various embodiments of the present disclosure, an electronic device may include at least one of part of furniture or buildings/structures supporting call forwarding service, electronic boards, electronic signature receiving devices, projectors, and various measuring instruments (for example, water, electricity, gas, or radio signal measuring instruments). An electronic device according to various embodiments of the present disclosure may be one of the above-mentioned various devices or a combination thereof. Additionally, an electronic device according to an embodiment of the present disclosure may be a flexible electronic device. Additionally, an electronic device according to an embodiment of the present disclosure is not limited to the above-mentioned devices and may include a new kind of an electronic device according to the technology development.

Hereinafter, an electronic device according to various embodiments of the present disclosure will be described in more detail with reference to the accompanying drawings. The term "user" in this disclosure may refer to a person using an electronic device or a device using an electronic device (for example, an artificial intelligent electronic device).

FIG. 1 is a view illustrating a sharing content operating environment according to various embodiments of the present disclosure.

Referring to FIG. 1, a sharing content operating environment according to various embodiments of the present disclosure may include an electronic device 100, at least one external electronic device 200, a server 300, and a network 162. The electronic device 100 and the at least one external electronic device 200 may access the server 300 via the network 162.

The electronic device 100 may request a sharing content operation from the server 300. The electronic device 100 may provide a list of external electronic devices that operate a sharing content together, to the server 300. Alternatively, the electronic device 100 may receive an external electronic device list from the server 300, select an external electronic device that operates a sharing content together from the received external electronic device list, and provide a selection list to the server 300.

The electronic device 100 may receive an item of at least one selection external electronic device that participates in a sharing content operation from the server 300. The electronic device 100 may specify a role according to the characteristics of an external electronic device or a relationship with a user of an electronic device. An operation authority (for example, access authority and collision avoidance authority) for a sharing content determined according to a role set by the electronic device 100 may be allocated to an external electronic device through the server 300. The role, for example, may include a priority for a sharing content change of the electronic device 100 or the at least one external electronic device 200. The operation authority may include a sharing content change authority or collision avoidance authority of the electronic device 100 or the external electronic device 200 in areas of a sharing content. An operation authority of the electronic device 100 or the external electronic device 200 may be determined according to the role. Additionally, even with the same operation authority, an operation authority of a specific device may be limited according to the priority of a role. The operation authority may be changed according to a request. The role may be also changed according to a request of the electronic device 100 or the external electronic device 200.

According to various embodiments of the present disclosure, the electronic device 100 may perform an external electronic device change in relation to a sharing content operation. For example, the electronic device 100 may provide a request for adding an external electronic device that operates a sharing content or a request for deleting an external electronic device that participates in a sharing content operation, to the server 300. Additionally, the electronic device 100 may process an operation authority change of an external electronic device. According to the operation authority change of the external electronic device, the electronic device 100 may provide external device change information to the server 300.

The electronic device 100 may generate sharing content operation related first input information (for example, at least one of virtual button selection information included in a sharing content, stroke information based on a write input, object movement information, or object selection information). The first input information generated by the electronic device 100 may be provided to the server 300. According to an operation of the server 300, an updated sharing content where first input information inputted by the electronic device 100 is applied may be synchronized with a sharing content stored in the external electronic device 200.

According to an embodiment of the present disclosure, according to an operation authority set by the electronic device 100, collision (or at least partial overlapping) between the first input information and second input information inputted by an external electronic device may be processed I the server 300. For example, when an operation authority priority of the electronic device 100 is higher than that of the external electronic device 200, an input of a second input information related external electronic device may be limited in a content area where first input information and second input information collision. According to various embodiments of the present disclosure, when an operation authority priority of the electronic device 100 is lower than that of the external electronic device 200, an input of a first input information related external electronic device 100 may be limited in a content area where first input information and second input information collision. When a collision possibility is less than a specified value according to a control of the server 300, a content operation related input limitation may be released.

The at least one external electronic device 200 may access the server 300 via the network 162. Alternatively, the external electronic device 200 may receive a sharing content task request requested by the electronic device 100 from the server 300. The external electronic device 200 may obtain a sharing content operation authority according to a sharing content task request acceptance. The at least one external electronic device 200 may have a sharing content change authority of each different size according to the obtained operation authority. Additionally, the external electronic device 200 may have a collision avoidance authority having a different priority according to the obtained operation authority. According to an embodiment of the present disclosure, when the external electronic device 200 has a relatively low priority, a content change related input may be limited in relation to input information inputted by the electronic device 100 or another external electronic device.

According to various embodiments of the present disclosure, the external electronic device 200 may request an operation authority change from the server 300 or the electronic device 100, and change it. The external electronic device 200 may obtain a sharing content operation authority (for example, as an access authority for content areas, for example, content execution authority, content playback authority, input information change authority applied to content, input means change authority, and so on) changed according to an operation authority change. Additionally, the external electronic device 200 may request sharing content task termination or input information application cancel.

The server 300 may establish a communication channel with the electronic device 100 or the at least one external electronic device 200 via the network 162. The server 300 may receive a sharing content operation request from the electronic device 100. The sharing content, for example, may include a content provided by the electronic device 100 or stored in the server 300. The server 300 may synchronize a sharing content that is temporarily stored in the electronic device 100 and the external electronic device 200. In relation to this, the server 300 may perform synchronization with a sharing content stored in corresponding devices by temporarily storing a sharing content (or generating and operating a copy of a sharing content) and transmitting a portion changed by first input information of the electronic device 100 or a portion changed by second input information of the external electronic device 200 to the electronic device 100 and the external electronic device 200.

According to various embodiments of the present disclosure, the server 300 may determine whether collision occurs between the first input information and the second input information. For example, the server 300 may obtain input information in real time or at a predetermined period, and analyze at least one of the size, progressing direction, and progressing speed of input information. When a collision occurrence possibility is greater than a specified value based on the analyzed information, the server 300 may process the input limit of at least one of the electronic device 100 and the external electronic device 200. According to an embodiment of the present disclosure, the server 300 may receive stroke data (for example, raw data) and determine a collision occurrence possibility by analyzing the received stroke data. During this operation, the server 300 may determine a collision occurrence possibility by receiving stroke related information (for example, vector information) from the electronic device 100 or the external electronic device 200. The server 300 may receive the movement of an object included in a sharing content from the electronic device 100 or the external electronic device 200 and determine collision of objects. According to various embodiments of the present disclosure, the server 300 may receive stroke data (or vector information) from the electronic device 100 (or the external electronic device 200) and receive object movement information from the external electronic device 200 (or the electronic device 100). In this case, the server 300 may determine a collision occurrence possibility of stroke information and object movement information.

According to an embodiment of the present disclosure, the server 300 may generate lock information for limiting an input, based on first input information of a device, for example, the electronic device 100, having an operation authority of a high priority. The server 300 may limit input information not to be generated in a content area specified by lock information by providing the generated lock information to the external electronic device 200. Alternatively, the server 300 may ignore the input information of the external electronic device 200 in a content area corresponding to the lock information.

According to various embodiments of the present disclosure, the server 300 tests collision possibility in real time or at a predetermined period and when the collision possibility is less than a specified value, generate lock release information. The server 300 may provide the lock release information to a device with a low priority, for example, the external electronic device 200. Alternatively, the server 300 may provide the lock release information to the external electronic device 200 that receives lock information.

According to various embodiments of the present disclosure, the server 300 may generate effect information in order to output at least one specified effect in relation to a content area having a collision occurrence possibility. The effect information, for example, may include at least one of visual information, audio information, and vibration information, which guide the position and size of a content area corresponding to lock information. At least one of the electronic device 100 and the external electronic device 200, which receive the effect information, may perform an information output corresponding to the effect information. According to an embodiment of the present disclosure, the server 300 may transmit the effect information and the lock information to a device having an operation authority of a low priority, for example, the external electronic device 200. Additionally, the server 300 may provide at least one of a message for guiding that there is a collision occurrence possibility in a specific area (for example, a content area being changed by first input information), a message that input is not limited even in that case, and information on the input limited external electronic device 200, to a device having an operation authority of a high priority, for example, the electronic device 100.

Figure 2:
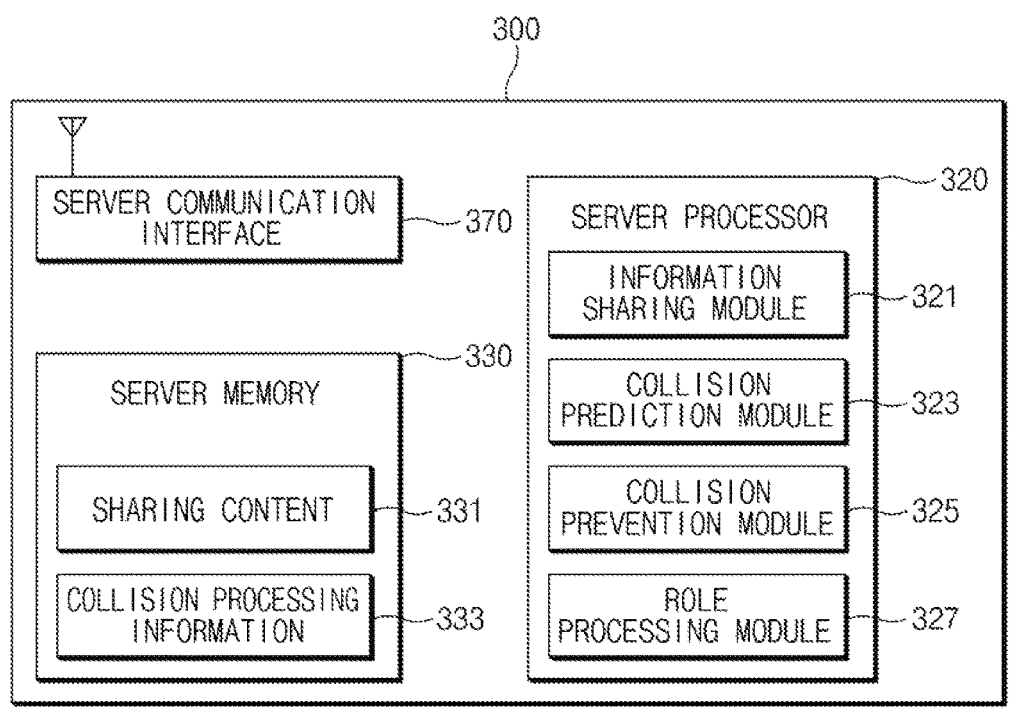
FIG. 2 is a view illustrating one example of a server configuration according to various embodiments of the present disclosure.

FIG. 2 is a view illustrating one example of a server configuration according to an embodiment of the present disclosure.

Referring to FIG. 2, a server 300 according to an embodiment of the present disclosure may include a server processor 320, a server memory 330, and a server communication interface 370.

The server processor 320 may perform a process relating to an operation of the server 300. For example, the server processor 320 may perform at least one process relating to a sharing content operation request of the electronic device 100. In relation to this, the server processor 320 may include an information sharing module 321, a collision prediction module 323, a collision prevention module 325, and a role processing module 327.

The information sharing module 321 may collect user information of the electronic device 100 and the external electronic device 200, and store and manage the user information. According to an embodiment of the present disclosure, the server 300 may receive at least one external electronic device list from the electronic device 100. The server 300 may transmit a sharing content participation request message requested by the electronic device 100, to external electronic devices included in an external electronic device list. The server 300 may collect information on external electronic device accepted for participation and provide the information to the electronic device 100. The information sharing module 321 may deliver electronic device information and external electronic device information to the role processing module 327.

According to various embodiments of the present disclosure, the information sharing module 321 may process applying a sharing content 331 to the electronic device 100 or the external electronic device 200. In relation to this, the information sharing module 321 may generate an updated sharing content by applying information received from the electronic device 100 or the external electronic device 200 to the sharing content 331. During this operation, the information sharing module 321 may deliver the received input information to the collision prediction module 323. For example, the information sharing module 321 may share input data in real time, which is inputted from a plurality of devices (for example, an electronic device and an external electronic device). The input data, for example, may include indexing stroke data (or raw stroke data) received by a server communication interface from an external electronic device. The indexing stroke data, for example, may stroke information (for example, dot) and an indexed value relating to a writing pressure, a pen attribute, a pen type, a z axis, an order value, and a time line. The information sharing module 321 may integrate the input data based on documents and in order to transmit additionally-integrated update data to an external electronic device, deliver it to a server communication interface.

If there is no collision occurrence possibility, the information sharing module 321 may generate an updated sharing content by applying input information to the sharing content 331. When receiving information (for example, a message or flag for guiding collision occurrence possibility) on collision occurrence possibility from the collision prediction module 323, the information sharing module 321 may apply only specific input information (for example, input information of an electronic device with a relatively high priority) to the sharing content 331, based on role information. Alternatively, the information sharing module 321 may apply, to the sharing content 332 together, input information (for example, input information of an electronic device and an external electronic device) until it is determined that there is collision occurrence possibility, and apply, to the sharing content 331, only specific input information among input information inputted after it is determined that there is collision occurrence possibility.

Accordingly, the information sharing module 321 may generate an updated sharing content by applying at least some input information to the sharing content 331. The information sharing module 321 may deliver an updated sharing content to the electronic device 100 or the external electronic device 200. According to various embodiments of the present disclosure, the information sharing module 321 may generate update information while applying input information to the sharing content 331. The information sharing module 321 may perform support to update the sharing content 331 stored in the electronic device 100 or the external electronic device 200 by delivering update information to the electronic device 100 or the external electronic device 200.

The collision prediction module 323 may predict collision occurrence possibility based on input information from the information sharing module 321, which inputted by the electronic device 100 or the external electronic device 200. For example, the collision prediction module 323 may determine an estimation area of a direction in which input information is written by determining at least one of the direction, moving speed, and input size of the input information, based on input information of the electronic device 100. Additionally, the collision prediction module 323 may determine an estimation area of a direction in which input information is written in correspondence to the input information of the external electronic device 200. The estimation area may be determined differently in correspondence to the size, moving speed, and input type of an input. When an estimation area corresponding to input information of the electronic device 100 partially overlaps an estimation area corresponding to input information of the external electronic device 200, the collision prediction module 323 may determine that there is collision occurrence possibility. If there is collision occurrence possibility, the collision prediction module 323 may deliver this to the information sharing module 321 and the collision prevention module 325. According to various embodiments of the present disclosure, the collision prediction module 323 may determine whether two or more input progressing directions collide with each other at a predetermined time point based on input information. When it is determined that the progressing directions overlap at a predetermined time point, the collision prediction module 323 may determine that there is collision occurrence possibility.

The collision prediction module 323 may check whether the collision occurrence possibility is released (or removed) based on received input information. For example, when an estimation area calculated based on input information of the electronic device 100 does not overlap an estimation area calculated based on input information of the external electronic device 200 (or when it is generated in a form that input directions do not collide with each other), the collision prediction module 323 may determine that the collision occurrence possibility is released. If the collision occurrence possibility is removed, the collision prediction module 323 may deliver the removal related information to the collision prevention module 325.

The collision prevention module 325 may receive a message for guiding that there is collision occurrence possibility and information on an estimation area, from the collision prediction module 323. The collision prevention module 325 may generate lock information for limiting an input with respect to an estimation area. During this operation, the collision prevention module 325 may check role information. The collision prevention module 325 may select a device that is to transmit lock information, for example, the external electronic device 200 (or the electronic device 100) having a relatively low priority. The collision prevention module 325 may deliver lock information to the selected device.

According to various embodiments of the present disclosure, when receiving information on the removal of collision occurrence possibility, the collision prevention module 325 may generate lock release information. The collision prevention module 325 may transmit lock release information to a device that transmits lock information, for example, the external electronic device 200.

The role processing module 327 may set an operation authority based on user information of devices participating in a sharing content operation or according to a user input of the electronic device 100. For example, in relation to a sharing content operation, the role processing module 327 may determine an area where the electronic device 100 works, an area where at least one external electronic device 200 works, and areas where the electronic device 100 and the external electronic device 200 work in collaboration according to a specified policy or a selection of the electronic device 100. Role information including an operation authority for the determined areas may be delivered to the electronic device 100 or the external electronic device 200. According to various embodiments of the present disclosure, the role processing module 327 may divide the sharing content 331 evenly or unevenly according to the number of participating devices in relation to a sharing content operation, and deliver role information including an operation authority for the divided areas to the electronic device 100 or the external electronic device 200.

According to various embodiments of the present disclosure, the role processing module 327 may perform role information processing according to the participation termination of the electronic device 100 for the sharing content 331 or the additional participation or participation termination of at least one external electronic device 200 for the sharing content 331. According to an embodiment of the present disclosure, when the participation termination of the electronic device 100 that requests a sharing content operation is requested, the role processing module 327 may terminate the sharing content operation of the electronic device 100. When the electronic device 100 is excluded, the role processing module 327 may generate role information relating to a corresponding sharing content operation based on the remaining external electronic devices. The role processing module 327 may deliver newly generated role information to the external electronic device 200.

According to various embodiments of the present disclosure, when an external electronic device is added or an external electronic device in participation is participation-terminated, the role processing module 327 may generate role information newly based on devices that participate in sharing the current sharing content 331. The role processing module 327 may provide the newly generated role information to the electronic device 100 or the external electronic device 200.

The server memory 330 may store an operating system (OS) relating to an operation of the server 300 or service operation related information. According to an embodiment of the present disclosure, the server memory 330 may store a sharing content 331 and collision processing information 333, which are provided when the electronic device 100 requests a sharing content operation. The server memory 330 may generate a copy of the previous sharing content 331 to provide the copy to the server processor 320 in relation to the update of the sharing content 331. The collision processing information 333 may include reference information for determining a collision occurrence of input information provided by an electronic device or an external electronic device. For example, the collision processing information 333 may include position information on a collision occurrence determination area of a specific content (for example, document). Additionally, the collision processing information 333 may include a distance between points where input information is indicated (for example, a distance that is predicted or determined as collision occurrence when within a predetermined distance).

The server processor 320 may determine a collision occurrence based on the collision processing information 333 by applying input information to the copy of the sharing content 331. The sharing content 331 may be updated by input information provided by the electronic device 100 or the external electronic device 200. The updated sharing content may be provided to the electronic device 100 or the external electronic device 200 and synchronized. According to various embodiments of the present disclosure, the server memory 330 may store a list of external electronic devices participating in a sharing content operation and history information corresponding to electronic device information. When a request relating to the sharing content operation occurs again, the stored and managed history information may be provided to at least one of the electronic device 100 or the external electronic device 200.

The server communication interface 370 may establish a communication channel with the electronic device 100 or at least one external electronic device 200. According to an embodiment of the present disclosure, the server communication interface 370 may receive a sharing content operation request from the electronic device 100. During this operation, the server communication interface 370 may receive the sharing content 331 or index information of the sharing content 331. Additionally, the server communication interface 370 may receive collaborative external electronic device related information. The server communication interface 370 may receive sharing content operation related input information from the electronic device 100 or the external electronic device 200. The server communication interface 370 may deliver lock information or lock release information to a specified device (for example, a device having a relatively low priority). According to the above-mentioned various embodiments of the present disclosure, a server according to an embodiment of the present disclosure may include a communication interface for receiving a sharing content, a memory for storing at least one instruction relating to the sharing content processing, and a processor connected to the communication interface and the memory, and a processor performed by the instruction may collect input information from electronic devise relating to the sharing content operation, determine collision occurrence possibility of the collected input information, and transmit a specified effect to the electronic devices corresponding to the collision occurrence possibility.

According to various embodiments of the present disclosure, the processor may calculate estimation areas relating to input information based on at least one of the progressing direction, progressing speed, and input size of the input information and determine that there is collision occurrence possibility when some of the estimation areas overlap.

According to various embodiments of the present disclosure, the processor may transmit at least one of information for guiding collision occurrence possibility in the estimation area and identification information of an electronic device that collides in an estimation area, to an electronic device set with a relatively high priority.

According to various embodiments of the present disclosure, the processor may receive input information including stroke data or input information including object movement related data and calculate the estimation area based on the stroke data or the object movement data.

According to various embodiments of the present disclosure, the processor may perform support to allow a corresponding device to output at least one of visual information, audio information, and tactile information, which relate to an input limit of an electronic device set with a relatively low priority.

According to various embodiments of the present disclosure, the processor may set a sharing content operation authority of communication-connected electronic devices in relation to the sharing content operation and transmit lock information for limiting an input to an electronic device having a relatively low priority based on the sharing content operation authority.

According to various embodiments of the present disclosure, when the collision occurrence possibility is released or removed, the processor may transmit lock release information for releasing an input limit to an electronic device having the relatively low priority.

According to various embodiments of the present disclosure, the processor may set a collision determination area and a collision non-determination area among the sharing content areas, and perform processing on the collision occurrence possibility in a collision determination area.

Figure 3:
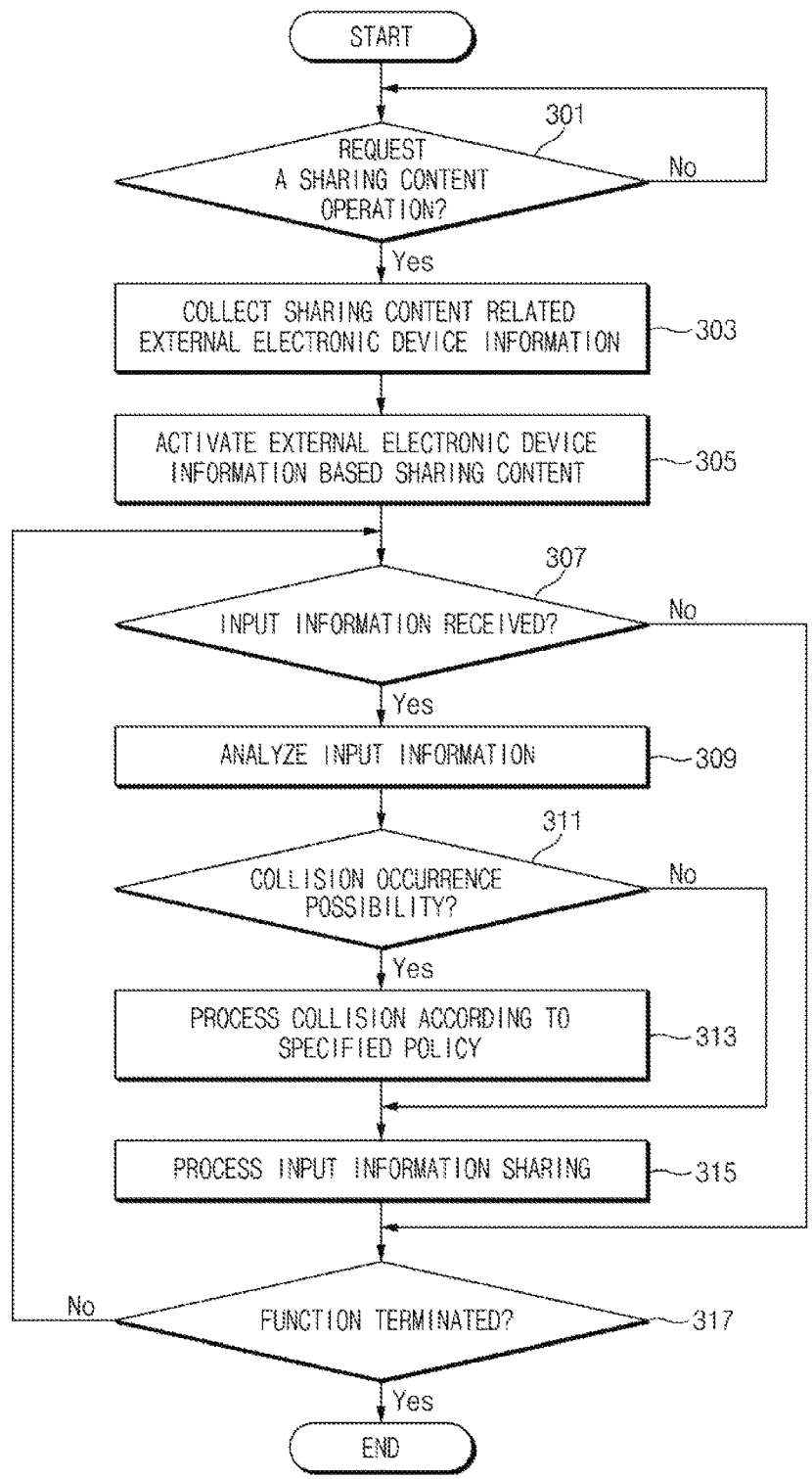
FIG. 3 is a view illustrating one example of a sharing content operation related server operating method according to various embodiments of the present disclosure.

FIG. 3 is a view illustrating one example of a sharing content operation related server operating method according to an embodiment of the present disclosure.

Referring to FIG. 3, in relation to the server operating method, in operation 301, the server 300 may check whether a sharing content operation request is received. If there is no sharing content operation request, the server 300 may branch into a previous state and have a corresponding request reception standby state. When the sharing content operation request occurs, in operation 303, the server 300 may collect information on the sharing content related external electronic device 200. For example, the server 300 may collect information on at least one external electronic device stored in the server memory 330 in relation to the sharing content. Alternatively, the server 300 may collect information on an external electronic device having a history of working on a sharing content, from the electronic device 100. According to various embodiments of the present disclosure, the server 300 may provide information on at least one accessed external electronic device to the electronic device 100 and collect information on at least one external electronic device that is to collaborate on a sharing content in correspondence to a selection of the electronic device 100.

According to various embodiments of the present disclosure, the server 300 may check the current state of an external electronic device corresponding to the collected information. For example, the server 300 may check whether it is possible that at least one external electronic device participates in the current sharing content operation. In relation to this, when the server 300 may collect the current state information (for example, presence information) of a related external electronic device in real time, at a predetermined period, or when a sharing content operation request occurs. When accessing the network 162 and having a function relating to the sharing content operation, the external electronic device 200 may provide its current state information to the electronic device 100 through the server 300 or directly. According to various embodiments of the present disclosure, the server 300 may transmit a sharing content operation related message (for example, a message for requesting participation in a sharing content operation) to at least one external electronic device 200.

In operation 305, the server 300 may provide a sharing content to each external electronic device based on the received external electronic device information. For example, the server 300 may provide a sharing content to at least one external electronic device that accepts participation. According to various embodiments of the present disclosure, when an external electronic device has the same sharing content operation history, the server 300 may provide operation requested sharing content index information to the external electronic device.

In operation 307, the server 300 may check whether input information is received from the electronic device 100 or the external electronic device 200. When there is no input information reception, the server 300 may omit the following operation and branch into operation 317. When input information is received, in operation 309, the server 300 may analyze the input information. In relation to the input information analysis, the server 300, for example, may determine an estimation area inputted later based on at least one of the input direction, moving speed, and input size of input information.

In operation 311, the server 300 may check whether there is collision occurrence possibility. For example, when estimation areas calculated based on input information of the electronic device 100 and the external electronic device 200 partially overlap each other or it is predicted that the estimation areas overlap each other (for example, prediction through the direction, moving speed, and input thickness of an input), the server 300 may determine that there is collision occurrence possibility. According to various embodiments of the present disclosure, the server 300 may check a specific area of the sharing content 331 where input information is applied is a predetermined collision occurrence determination area. In the case of a collision occurrence determination area, the server 300 may perform the collision prediction of input information. In the case of no collision occurrence determination area, the server 300 may omit a collision prediction operation of input information relating to a collision occurrence determination area.

If there is no collision occurrence possibility, the server 300 may omit the following operation and branch into operation 315. If there is collision occurrence possibility, in operation 313, the server 300 may perform collision processing according to a specified policy. For example, the server 300 may generate lock information that limits an input of a device which provides input information having a relatively low priority with respect to an operation authority. The server 300 may transmit the generated lock information to a device having a low priority. The lock information, for example, may include instructions for preventing an input for an estimation area (or an entire content area) or pushing a moved object to the outside of an estimation area. Alternatively, the server 300 may change input attribute information (for example, transparency, color, and so on) in an estimation area. According to various embodiments of the present disclosure, the server 300 may transmit effect information for guiding a lock information setting. The effect information may include a specified effect for guiding a lock information occurrence. For example, the effect information may include at least one of visual information (for example, information such as specified image or text output or highlight) for guiding the estimation area, visual information for guiding lock information reception, tactile information, and audio information.

In operation 315, the server 300 may perform input information sharing processing. For example, the server 300 may generate an updated sharing content by applying at least one of input information inputted by the electronic device 100 and input information inputted by the external electronic device 200 to the sharing content 331. During this operation, the server 300 may generate a sharing content where input information of a specified device (for example, a device having a relatively high operation authority priority) in an estimation area according to collision occurrence possibility. The server 300 may perform the synchronization of a sharing content stored in the electronic device 100 or the external electronic device 200 by delivering the updated sharing content to the electronic device 100 or the external electronic device 200.

In operation 317, the server 300 may check whether there is a function termination related input event. If there is a function termination input event, the server 300 may terminate a sharing content function. If there is no function termination input event, the server 300 may branch into operation 307 and perform subsequent operations again.

Figure 4:
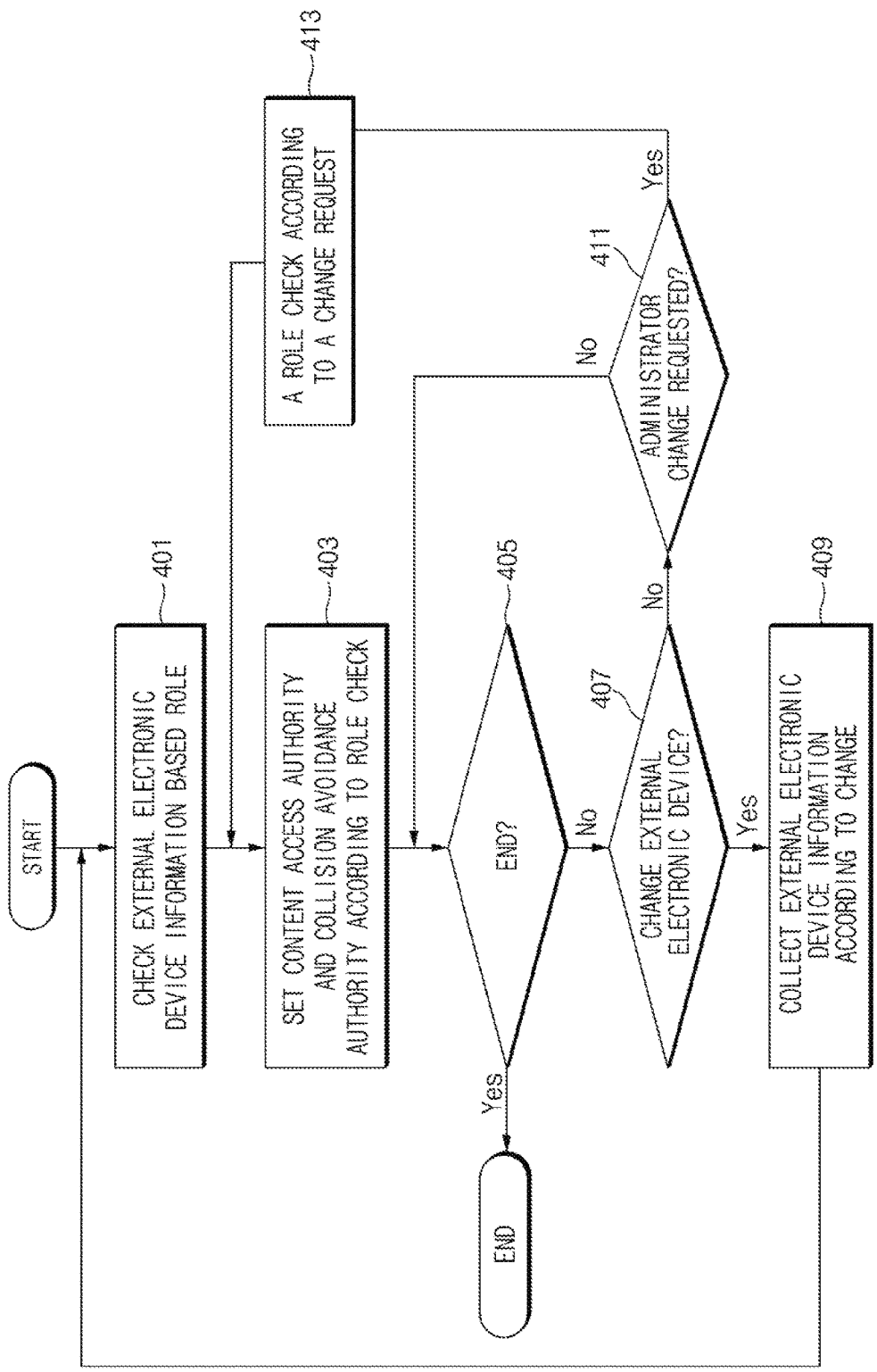
FIG. 4 is a view illustrating one example of an authority change related method in a server operating method according to various embodiments of the present disclosure.

FIG. 4 is a view illustrating one example of an authority change related method in a server operating method according to an embodiment of the present disclosure.

Referring to FIG. 4, in relation to a server operating method, when external electronic device information is collected, in operation 401, the server 300 may perform an external electronic device information based role check. For example, a plurality of external electronic devices may have a priority in relation to an operation authority of a sharing content. The priority may be set by the electronic device 100. Alternatively, the priority may be adjusted as the external electronic device 200 requests adjustment from the electronic device 100. Alternatively, a priority of the electronic device 100 or the external electronic device 200 may be determined according to a server policy (for example, a higher priority for a device having a fast participation order or a higher priority for a device having a participation history for the same content than a device having no participation history).

In operation 403, the server 300 may set a content access authority and a collision avoidance authority according to the role confirmation. For example, in comparison to an external electronic device having a relatively low priority, an external electronic device having a relatively high priority may vary in the size of a content access area and the number of functions available during a content operation. For example, a device having a relatively high priority may have an authority for changing a relatively broad content area. According to various embodiments of the present disclosure, a device having a relatively high priority may have a relatively high collision avoidance authority. A relatively high collision avoidance authority may have no input limit in an estimation area having collision occurrence possibility and may write input information.

In operation 405, the server 300 may check a termination related event occurrence. If a termination related event does not occur (for example, when a specified time elapses, when an authority setting for external electronic devices is completed, or when an input event for instructing an authority setting termination does not occur), the server 300 may check whether there is an external electronic device change related event in operation 407. If an event relating to a change of the external electronic device 200 occurs, for example, when the external device 200 is added or the external electronic device 200 participating in a task is detected, in operation 409, the server 300 may collect information on the external electronic device 200 according to a change. Since then, the server 300 may branch into operation 401 and perform subsequent operations. During this operation, the server 300 may receive a withdrawal request of a specific external electronic device 200 or a function termination request of the external electronic device 200. When receiving the withdrawal or function termination request (or a participation termination request) of the external electronic device 200, the server 300 may terminate the corresponding sharing content participation of the external electronic device 200. When the participation of at least one external electronic device among a plurality of external electronic devices is determined, the server 300 may re-generate role information based on the remaining external electronic devices. The server 300 may deliver the re-generated role information to the electronic device 100 and the external electronic device 200.

When an external electronic device is not changed, in operation 411, the server 300 may check whether there is an electronic device change request. If there is no change request of the electronic device 100, the method branches into operation 405 to terminate authority change related processing.

When a change request of the electronic device 100 occurs, in operation 413, the server may perform a role check according to a change request. According to an embodiment of the present disclosure, the server 300 may receive a function termination request of the electronic device 100. In this case, the server 300 may terminate the entire sharing content operation. Alternatively, the server may terminate the participation of the electronic device 100 and re-generate role information based on the remaining external electronic devices. During this operation, the server 300 may select a specific external electronic device (for example, a specified external electronic device or an arbitrary external electronic device) and specify the selected specific external electronic device as a manager device. The manager device may have an operation authority (for example, authority such as invitation of an external electronic device, withdrawal of an external electronic device in participation, and authority manual setting of role information) owned by the electronic device 100. According to various embodiments of the present disclosure, the electronic device 100 may request an operation authority change of a specific external electronic device 200 from the server 300. In this case, the server 300 may perform an operation authority (for example, at least one of priority order change, content access authority change, or collision avoidance authority change) of a corresponding external electronic device in correspondence to the request of the electronic device 100. When an operation authority of a specified external electronic device is changed, the server 300 may re-generate role information according to a change and transmit the re-generated role information to the electronic device 100 and at least one external electronic device. Since then, the server 300 may branch into operation 403 and perform subsequent operations.

Figure 5:
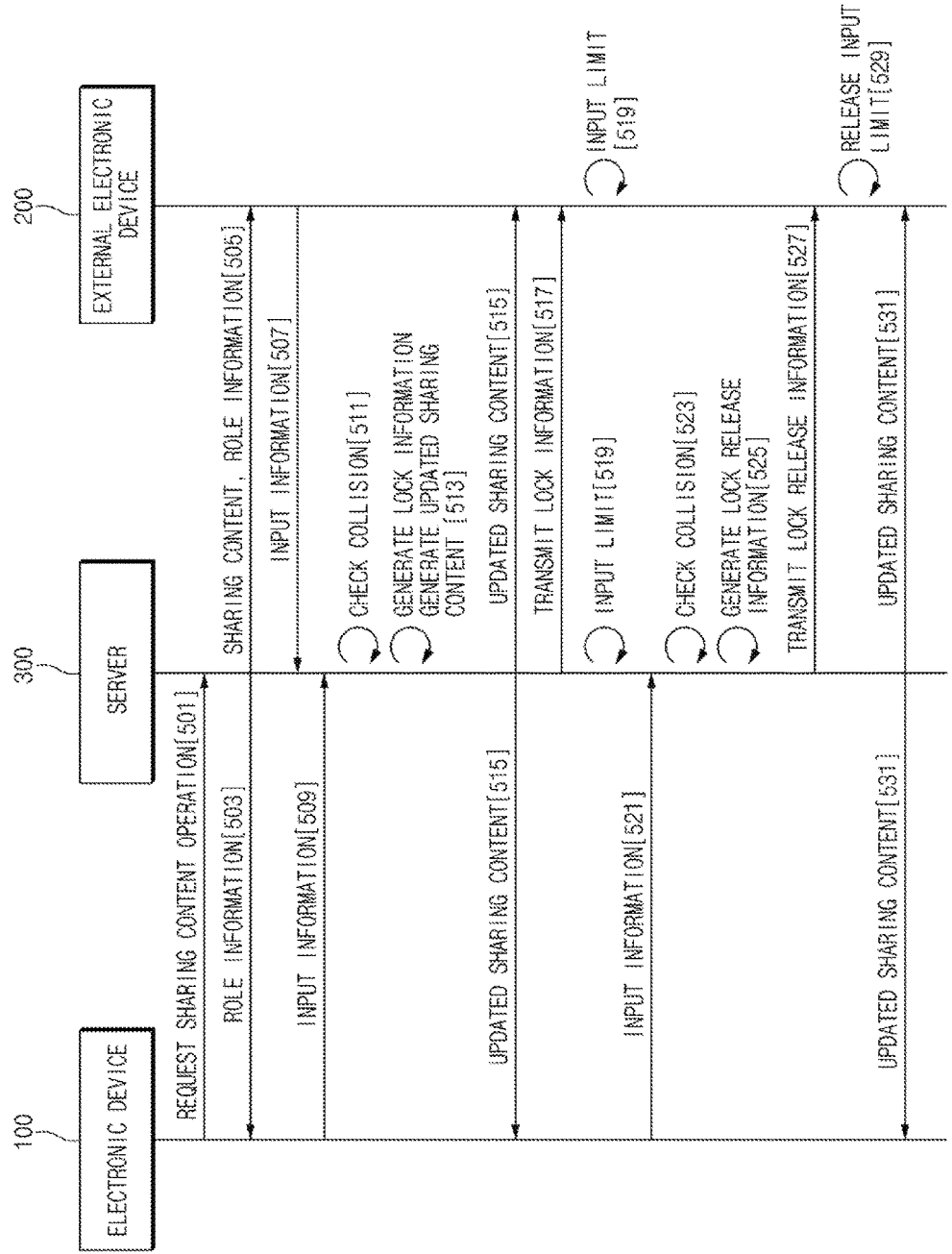
FIG. 5 is a view illustrating one example of a server operation related system signal flow according to various embodiments of the present disclosure.

FIG. 5 is a view illustrating one example of a server operation related system signal flow according to an embodiment of the present disclosure.

Referring to FIG. 5, in relation to a server operation, in operation 501, the electronic device 100 may request a sharing content operation from the server 300. For example, the electronic device 100 may create a sharing content operation request message and transmit it to the server 300. During this operation, the electronic device 100 may provide a list of external electronic devices that are to participate in a sharing content task, to the server 300. Alternatively, when the server 300 stores and manages the external electronic device list, the electronic device 100 may provide external electronic device selection information to the server 300.

In operation 503, the server 300 may transmit role information to the electronic device 100. The server 300 may generate role information of external electronic devices in correspondence to a request of the electronic device 100. The role information may include content access authority and collision avoidance authority.

In operation 505, the server 300 may transmit sharing content and role information to the external electronic device 200. Before this operation is performed, the server 300 may check whether at least one external electronic device 200 is to participate in a sharing content task. According to an embodiment of the present disclosure, the server 300 may transmit a message for asking whether to participate to external electronic devices selected by the electronic device 100 and provide sharing content and role information to an external electronic device that allows the participation. According to various embodiments of the present disclosure, the server 300 may provide sharing content and role information to an external electronic device in a push form (for example, without the participation permission of an external electronic device).

Although operation 503 and operation 505 are described above separately, according to various embodiments of the present disclosure, operation 503 and operation 505 may be performed at the same time. Alternatively, after operation 505 is performed, operation 503 may be performed. According to an embodiment of the present disclosure, the server 300 may ask external electronic devices (from which the electronic device 100 requests collaboration) about whether to participate and when the external electronic devices allow the participation, generate role information on sharing content based on information of the external electronic devices that allow the participation.

In operation 507, the server 300 may receive sharing content change related input information from any external electronic device 200 allowed to participate in a sharing content collaboration. Additionally, in operation 509, the server 300 may receive sharing content change related input information from the electronic device 100. The input information may be received first from the electronic device 100 compared to another electronic device or may be received simultaneously from the external electronic device 200 and the electronic device 100 for at least a predetermined time.

When input information is received, in operation 511, the server 300 may check a collision setting for an input location of the input information. When the input location of the input information has no collision setting, the server 300 may perform sharing content update and synchronize the updated sharing content. When the input location of the input information has a collision setting, the server 300 may perform collision processing according to role information. According to the collision processing, as in operation 513, the server 300 may generate lock information based on input information inputted by a device of a role having a relatively high priority. During this operation, the server 300 may generate an updated sharing content by performing input processing on the input information.

In operation 515, the server 300 may provide the updated sharing content to the electronic device 100. In operation 517, the server 300 may transmit the generated lock information to a device having a relatively low priority, for example, the external electronic device 200. Additionally, the server 300 may transmit the updated sharing content to the external electronic device 200. Operations 515 and 517 may be performed at the same time substantially. In operation 519, the external electronic device 200 receiving the lock information may have an input limit state according to the lock information. According to various embodiments of the present disclosure, even when receiving input information from the external electronic device 200, the server 300 may ignore the information from the external electronic device 200 according to lock information.

According to various embodiments of the present disclosure, in operation 521, the server 300 may receive input information from the electronic device 100. In operation 523, the server 300 may re-perform collision check on the received input information. According to an embodiment of the present disclosure, when lock information is generated according to collision occurrence possibility, the server 300 may determine whether collision occurrence possibility is maintained in a corresponding sharing content area based on the collected input information. When the collision occurrence possibility is released (or removed), the server 300 may generate lock release information in operation 525. Additionally, the server 300 may generate an updated sharing content by performing input information processing.

In operation 527, the server 300 may provide the lock release information to a device that provides lock information, for example, the external electronic device 200. In operation 529, the external electronic device 200 receiving the lock release information may have a release state for input limit. In operation 531, the server 300 may provide an updated sharing content to the electronic device 100 or the external electronic device 200. In the above operation, the server 300 may provide both the lock release information and the updated sharing content to the external electronic device 200 and transmit the simultaneously-updated sharing content to the electronic device 100 substantially. In this case, after the updated sharing content is transmitted, the external electronic device 200 may have a lock release state.

According to various embodiments of the present disclosure, in relation to a lock range setting, the server 300 may divide an area of content (for example, document) and specify a priority according to a role definition of each device. A device that receives lock information (for example, an electronic device or an external electronic device) may provide input ignorance, transparency specification, a warning message, and so on. In relation to lock release, the server 300 may re-define a lock area at a time point that an input of a user having an input authority of a specified lock area is terminated (or a specified time elapses after the last input). When lock area maintenance is required based on an input authority, the server 300 may maintain a lock state.

According to various embodiments of the present disclosure, a server operating method may include collecting input information from electronic devices relating to the sharing content operation, determining collision occurrence possibility of the collected input information, and transmitting a specified effect to the electronic devices when there is collision occurrence possibility.

According to various embodiments of the present disclosure, the determining of the collision occurrence possibility may include calculating estimation areas relating to input information based on at least one of the progressing direction, progressing speed, and input size of the input information and determining that there is collision occurrence possibility when some of the estimation areas overlap.

According to various embodiments of the present disclosure, the method may further include transmitting at least one of information for guiding collision occurrence possibility in the estimation area and identification information of an electronic device that collides in an estimation area, to an electronic device set with a relatively high priority.

According to various embodiments of the present disclosure, the collecting of the input information may include receiving input information including stroke data or input information including object movement related data and the determining of the collision occurrence possibility may include calculating the estimation area based on the stroke data or the object movement data.

According to various embodiments of the present disclosure, the method may further include providing support to allow a corresponding device to output at least one of visual information, audio information, and tactile information, which relate to an input limit of an electronic device set with a relatively low priority.

According to various embodiments of the present disclosure, the method may further include setting a sharing content operation authority of communication-connected electronic devices in relation to the sharing content operation and transmitting lock information for limiting an input to an electronic device having a relatively low priority based on the sharing content operation authority.

According to various embodiments of the present disclosure, when the collision occurrence possibility is released or removed, the method may further include transmitting lock release information for releasing an input limit to an electronic device having the relatively low priority.

According to various embodiments of the present disclosure, the method may further include setting a collision determination area and a collision non-determination area among the sharing content areas, and the determining of the collision occurrence possibility may include performing processing on the collision occurrence possibility in a collision determination area.

Figure 6:
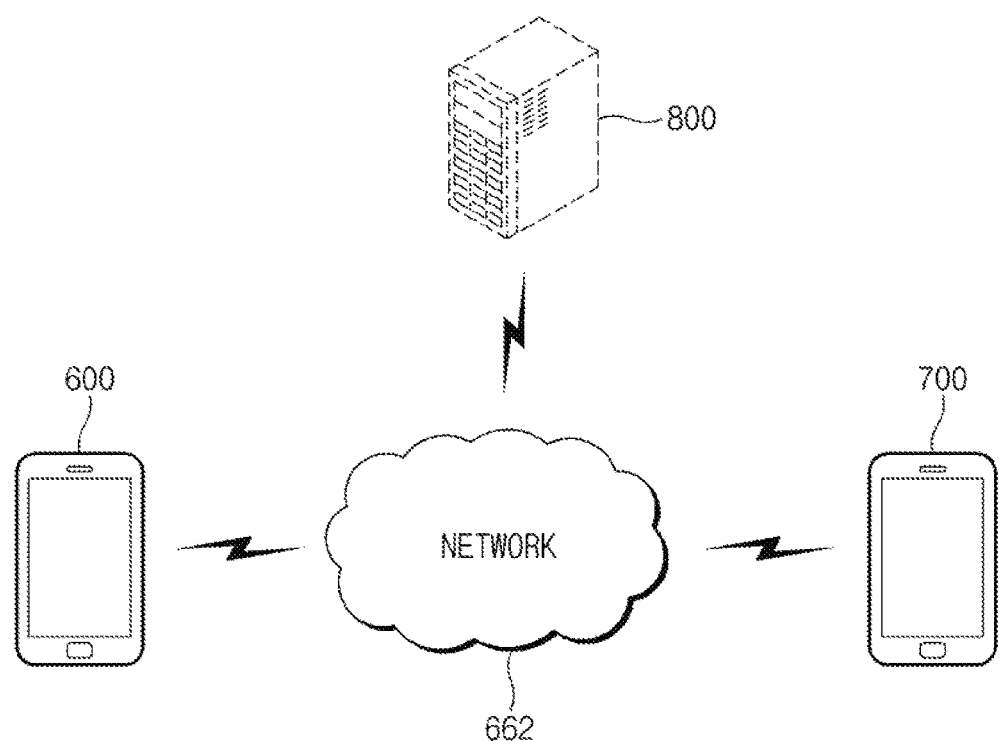
FIG. 6 is a view illustrating another example of a sharing content operating environment according to various embodiments of the present disclosure.

FIG. 6 is a view illustrating another example of a sharing content operating environment according to an embodiment of the present disclosure.

Referring to FIG. 6, the sharing content operating environment may include an electronic device 600, an external electronic device 700, and a network 662. According to various embodiments of the present disclosure, the electronic device 600 and the external electronic device 700, which relate to a sharing content operation, may perform information delivery directly via the network 662. According to various embodiments of the present disclosure, a server 800 for relaying the input signals of the electronic device 600 and the external electronic device 700 may be further included. In this case, the electronic device 600 and the external electronic device 700 may transmit information through the server 800.

The electronic device 600 may generate and share role information according to sharing content selection, selection of an external electronic device participating in a sharing content operation, and user information of an external electronic device. Additionally, the electronic device 600 may perform collision processing of sharing content related input information based on a user input and sharing content related input information inputted by the external electronic device 700. According to various embodiments of the present disclosure, the electronic device 600 may process a change of an external electronic device (for example, participation termination of a participating external electronic device and participation of a new external electronic device). In relation to this, the electronic device 600 may establish a communication channel with the external electronic device 700 or may be connected to the external electronic device 700 through the server 800.

The external electronic device 700 may be connected the electronic device 600 or the server 800 via the network 662. The external electronic device 700 may receive a sharing content operation related participation request from the electronic device 600. Alternatively, the external electronic device 700 may receive the participation request delivered from the electronic device through the relay server 800. When accepting the participation according to a user input, the external electronic device 700 may deliver participation acceptance information to the electronic device 600. According to the participation acceptance information delivery, the external electronic device 700 may receive sharing content from the electronic device 600. Alternatively, when the external electronic device 700 has an operation history for a sharing content, which is participation-requested by the electronic device 600, and stores the sharing content in advance, it may activate a corresponding sharing content. The external electronic device 700 may generate sharing content change related input information according to a user input. The external electronic device 700 may provide the input information to the electronic device 600.

According to various embodiments of the present disclosure, the external electronic device 700 may receive input limit related lock information from the electronic device 600. In this case, the external electronic device 700 may limit an input to at least some areas of a sharing content according to the lock information. The external electronic device 700 may receive lock release information. The external electronic device 700 may release an input limit according to the lock release information reception. According to various embodiments of the present disclosure, the external electronic device 700 may transmit a message for requesting participation to the electronic device 600 in relation to a specific sharing content operation. Additionally, the external electronic device 700 may request termination for a sharing content operation in participation from the electronic device 600.

The server 800 may perform data relay between the electronic device 600 and the external electronic device 700. During this operation, the server 800 may receive an updated sharing content according to input information processing, from the electronic device 600. The server 800 may perform sharing content synchronization by providing the updated sharing content to the external electronic device 700.

Figure 7:
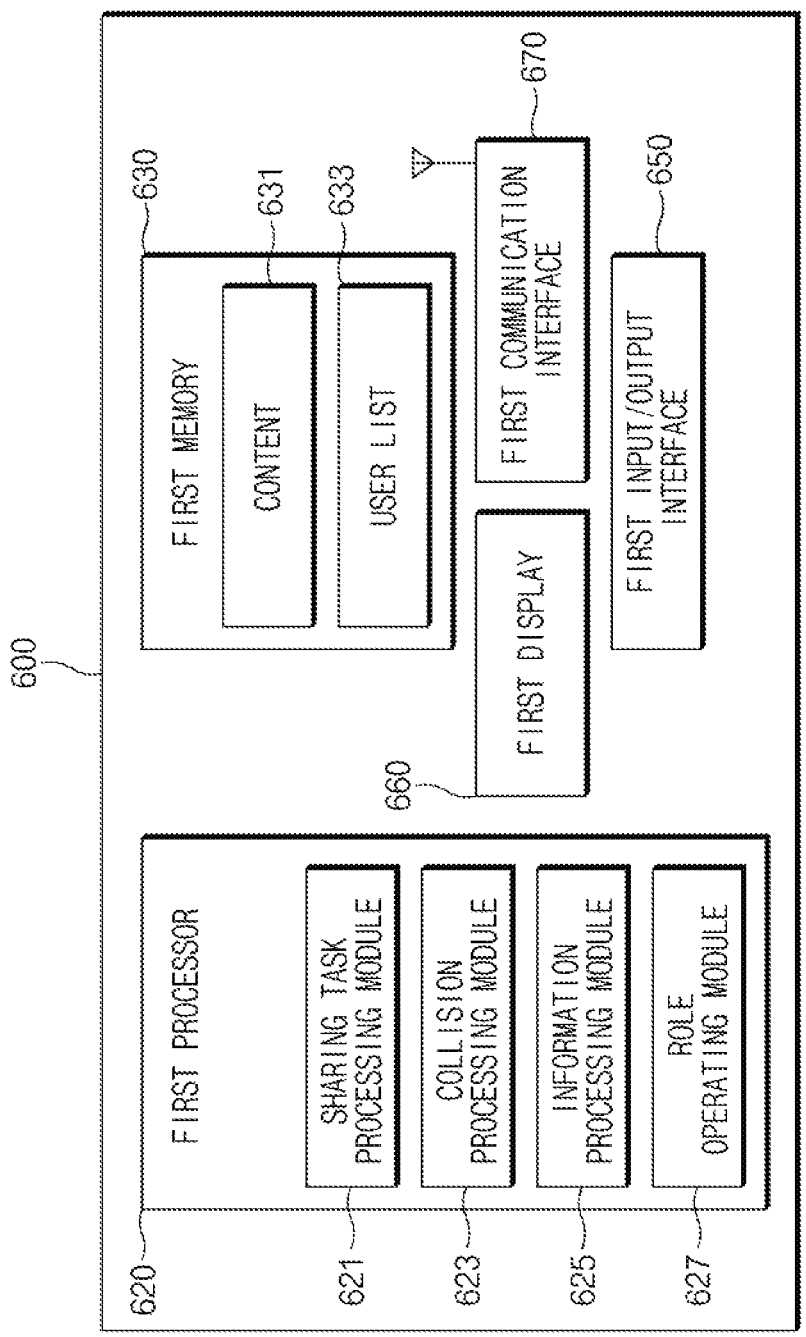
FIG. 7 is a view illustrating one example of an electronic device configuration according to various embodiments of the present disclosure.

FIG. 7 is a view illustrating one example of an electronic device configuration according to an embodiment of the present disclosure.

Referring to FIG. 7, the electronic device 600 may include a first processor 620 (for example, an AP), a first memory 630, a first communication module 670, a first display 660, and a first input/output interface 650. The electronic device 600, for example, may be implemented as a portable electronic device. The portable electronic device, for example, may be implemented as a mobile phone, a smartphone, a tablet PC, a PDA, an enterprise digital assistant (EDA), a digital still camera, a digital video camera, a PMP, a personal navigation device or portable navigation device (PND), a handheld game console, a mobile Internet device (MID), an Internet tablet, or a e-book reader.

The first processor 620 may control overall operations of the electronic device 600. According to an embodiment of the present disclosure, the first processor 620 may be implemented as an integrated circuit, a system on chip (SoC), or a mobile AP. The first processor 620 may include at least one module relating to sharing content processing. For example, the first processor 620 may include a sharing task processing module 621, a collision processing module 623, an information processing module 625, and a role operation module 627.

When at least one sharing content in the sharing content 631 stored in the first memory 630 is selected, the sharing task processing module 621 may collect user information of at least one external electronic device that is to collaborate on a related sharing content. For example, the sharing task processing module 621 may select an external electronic device to collaborate with by providing phone book information. Alternatively, the sharing task processing module 621 may check an operation history of a sharing content. When the sharing content has an operation history, the sharing task processing module 621 may provide a list of external electronic devices having a history of participating in a corresponding sharing content before. The sharing task processing module 621 may select user information corresponding to an external electronic device from a phone book or select an external electronic device from a list of external electronic devices having a participation history according to a user input, or may automatically select external electronic devices having a participation history. The sharing task processing module 621 may transmit a participation request message to the selected external electronic device. During this operation, the sharing task processing module 621 may check the current state of the external electronic device 700. For example, it is checked whether the external electronic device 700 is able to participate in relation to a sharing content operation. In relation to the current state sharing, the electronic device 600 and the external electronic device 700 may set information for indicating their current states to be shared. The sharing task processing module 621 may provide user information of an external electronic device that accepts the participation to the role operation module 627.

According to various embodiments of the present disclosure, after first collecting external electronic devices that operate a sharing content together, the sharing task processing module 621 may support sharing content selection. In relation to this, the sharing task processing module 621 may transmit a participation request message relating to an arbitrary (or unspecified) sharing content operation to at least one external electronic device. When a participation request from at least one external electronic device is accepted, the sharing task processing module 621 may provide a screen for selecting a sharing content. If there is no participation request of an external electronic device, a sharing content selection screen output may be limited.

The role operation module 627 may check user information of at least one external electronic device that participates in relation to a sharing content operation. The role operation module 627 may set an operation authority (for example, content access authority and collision avoidance authority) based on user information of external electronic devices. According to various embodiments of the present disclosure, the role operation module 627 may set an operation authority of external electronic devices in correspondence to a user input. When the operation authority is determined, the role operation module 627 may generate role information according to the determined operation authority and provide this to an external electronic device. The role operation module 627 may provide the role information to the collision processing module 623.

The role operation module 627 may process an external electronic device change relating to a sharing content operation. For example, when a participation request is received from the external electronic device 700, the role operation module 627 may allow the external electronic device 700 to participate in a sharing content operation in correspondence to a user input. During this operation, the role operation module 627 may provide a sharing content to the external electronic device 700. When the external electronic device 700 is changed, the role operation module 627 may determine a role by checking user information of the external electronic device 700 or determine a role according to a user input. During this operation, the role operation module 627 may perform role redistribution by again checking user information of entire external electronic devices relating to a corresponding sharing content. Alternatively, the role operation module 627 may support a user of the electronic device 600 to check role information by outputting a role information screen allocated to external electronic devices relating to a sharing content. The role information screen may provide a function for changing the roles of specific external electronic devices in correspondence to a user input. According to various embodiments of the present disclosure, the role processing module 627 may support the participation termination of an external electronic device that requests participation termination among a plurality of external electronic devices participating in relation to a sharing content operation. During this operation, the role processing module 627 may update role information of the remaining external electronic devices except for an external electronic device that terminates the participation, automatically or according to a user input.

According to various embodiments of the present disclosure, when an electronic device and three external electronic devices participate in relation to a sharing content operation, the role processing module 627 may divide a sharing content area by a specified size and set an operation authority for the divided areas. The role processing module 627 may change the size and position of a change area of the sharing content according to a user input or an external electronic device request. When a new external electronic device participates, the role processing module 627 may re-divide a sharing content area based on the number of entire devices and set an operation authority for the divided areas. When an external electronic device in participation is terminated, the role processing module 627 may re-divide a sharing content area based on the number of reduced participating devices and set an operation authority for the divided areas.

The collision processing module 623 may determine collision possibility in real time or at a predetermined period with respect to input information provided from the electronic device 600 and the external electronic device 700. For example, the collision processing module 623 may estimate a direction or area that input information progresses by determining at least one of the direction, input speed, and input size of a user input. The collision processing module 623 may check whether the estimation directions or estimation areas of input information overlap. When it is predicted that the estimation directions of input information overlap at a predetermined time point or when estimation areas overlap by more than a specified size, the collision processing module 623 may determine that there is collision possibility. In relation to the overlap determination for an estimation direction, the collision processing module 623 may draw virtual extension lines for an estimation direction of input information and then, check whether the virtual extension lines overlap. When virtual extension lines overlap, the collision processing module 623 may determine that there is collision occurrence possibility. Alternatively, when there is an overlap area of virtual extension lines within a specified distance at the current input point, the collision processing module 623 may determine that there is collision occurrence possibility.

If there is collision possibility, the collision processing module 623 may generate input limit related lock information based on role information. For example, the collision processing module 623 may generate lock information for limiting an input of a device having a relatively low priority. The collision processing module 623 may provide the generated lock information to a device having a relatively low collision avoidance authority. If the collision possibility disappears, the collision processing module 623 may generate lock release information. The collision processing module 623 may deliver the lock release information to a device that provides lock information.

According to various embodiments of the present disclosure, the collision processing module 623 may determine a collision occurrence determination area and a collision possibility non-determination area in a sharing content area according to a user input or according to characteristics of information disposed in content. When it is determined that input information collides with each other in a conflict occurrence determination area, the collision processing module 623 may generate the lock information. The collision processing module 623 may not perform collision processing on input information in a collision possibility non-determination area.

The information processing module 625 may process sharing content update according to the reception of input information. For example, when input information is collected from a collision occurrence determination area in a sharing content area, the information processing module 625 may generate an updated sharing content by applying input information of a specified device (for example, a device set with a relatively high priority) to a sharing content. In a collision possibility non-determination area in a sharing content area, the information processing module 625 may overlap and apply input information. The information processing module 625 may provide the updated sharing content to the external electronic device 700. Alternatively, the information processing module 625 may provide the updated sharing content to the external electronic device 700 through the server 800. According to various embodiments of the present disclosure, the information processing module 625 may generate update information of a sharing content where input information is applied. The information processing module 625 may update a sharing content stored in the external electronic device 700 by transmitting the update information to the external electronic device 700.

The first memory 630 may store at least one program relating to an operation of the electronic device 600 and data relating to a program operation. According to an embodiment of the present disclosure, the first memory 630 may store an OS of the electronic device 600. Additionally, the first memory 630 may store the sharing content 631 and a user list 633. The sharing content 631, for example, may include at least one content that is collaborative with the external electronic device 700. According to various embodiments of the present disclosure, the sharing content 631 may include a previous collaboration history. In this case, the sharing content 631 may include information on a list of previously collaborated external electronic devices. The user list 633 may include a list of participation available external electronic devices in relation to an operation of the sharing content 631. The user list 633 may be outputted to a first display 160 in relation to an operation of the sharing content 631.

The first input/output interface 650, for example, may serve as an interface for delivering instructions or data inputted from a user or another external device to another component(s) of the electronic device 600. Additionally, the first input/output interface 650 may output instructions or data received from another component(s) of the electronic device 600 to a user or another external device. The first input/output interface 650, for example, may include at least one physical button, touch button, touch pad, or touch screen. Additionally, the first input/output interface 650 may include an input means by an electronic pen. The first input/output interface 650, for example, may receive a sharing content selection related input signal and an input signal relating to the selection of an external electronic device that is to participate in correspondence to a user input. The first input/output interface 650 may receive an input signal relating to a change of an operation authority, the participation acceptance of a new external electronic device, and termination processing of an external electronic device, in correspondence to a user input.

According to various embodiments of the present disclosure, the first input/output interface 650 may include an audio device for collecting or outputting audio signals. According to an embodiment of the present disclosure, when collision possibility occurs in correspondence to a control of the first processor 620, the audio device may output specified audio information corresponding thereto (for example, an audio message for guiding collision possibility occurrence). Additionally, when the collision possibility is released, the audio device may output specified audio information corresponding thereto (for example, an audio message for guiding collision possibility release).

The first display 660 may be implemented as a thin film transistor-liquid crystal display (TFT-LCD) panel, a light emitting diode (LED) panel, an organic LED (OLED) panel, an active matrix OLED (AMOLED) panel, or a flexible panel. The first display 660 may output an execution screen according to a specified application execution. According to an embodiment of the present disclosure, the first display 660 may output a sharing content operation related screen. For example, the first display 660 may output a screen for a list of the sharing content 631, a screen for the user list 633 corresponding to a list of collaborative external electronic devices, and a screen (for example, an updated sharing content output screen) where input information is applied during a sharing content operation. According to various embodiments of the present disclosure, the first display 160 may provide a specified effect (for example, a visual effect) for an area having collision possibility. For example, the first display 160 may display an estimation area with a different color from a peripheral area. Alternatively, the first display 160 may output a message for guiding estimation area occurrence.

The first communication module 670 may include at least one module for establishing a communication channel of the electronic device 600. Alternatively, the first communication module 670 may support at least one communication method. According to various embodiments of the present disclosure, the first communication module 670, for example, may directly establish a communication channel with the external electronic device 700 based on the network 662. The first communication module 670 may transmit/receive sharing content operation related information to/from the external electronic device 700. For example, the first communication module 670 may transmit a participation request message for requesting sharing content collaboration to the external electronic device 700. Alternatively, the first communication module 670 may receive a sharing content participation request message from the external electronic device 700.

The first communication module 670 may receive input information from the external electronic device 700. The first communication module 670 may transmit lock information to at least one external electronic device according to collision possibility occurrence. Additionally, the first communication module 670 may transmit lock release information to at least one external electronic device according to collision possibility release.

According to the above-mentioned various embodiments of the present disclosure, an electronic device may include: an input interface configured to receive first input information relating to a sharing content operation; a communication interface configured to receive second input information relating to the sharing content operation from at least one external electronic device; a memory configured to store at least one instruction relating to processing of the sharing content; and a processor electronically connected to the input interface, the communication interface, and the memory. The processor, executed by the instruction, may determine collision occurrence possibility of the first input information inputted in relation to the sharing content operation and the second input information received from the at least one external electronic device in relation to the sharing content operation and apply a specified effect corresponding to the collision occurrence possibility.

According to the above-mentioned various embodiments of the present disclosure, an electronic device may include: an input interface configured to receive first input information relating to a sharing content operation; a communication interface configured to receive second input information relating to the sharing content operation from at least one external electronic device; a memory configured to store at least one instruction relating to processing of the sharing content; and a processor electronically connected to the input interface, the communication interface, and the memory. The processor, executed by the instruction, may determine collision occurrence possibility of the first input information and the second input information and apply a specified effect corresponding to the collision occurrence possibility.

According to various embodiments of the present disclosure, the processor may calculate a first estimation area of a display relating to the first input information according to at least one of a progressing direction, progressing speed, and input size of the first input information and calculate a second estimation area of the display relating to the second input information based on at least one of a progressing direction, progressing speed, and input size of the second input information, thereby determining that there is collision occurrence possibility when at least a part of the first estimation area and at least a part of the second estimation area is overlapped.

According to various embodiments of the present disclosure, the processor may output at least one of information for guiding collision occurrence possibility and identification information of at least one device having collision occurrence possibility to an estimation area of a display of a device having a relatively low priority.

According to various embodiments of the present disclosure, the processor calculates the first estimation area or the second estimation area based on a stroke input or a movement of a specified object.

According to various embodiments of the present disclosure, when it is possible that the first estimation area and the second estimation area overlap each other, the processor may move an object corresponding to input information of a device having a relatively low priority in a specified direction.

According to various embodiments of the present disclosure, the processor may vary a size of the first estimation area corresponding to at least one of a progressing direction, progressing speed, and input size of the first input information or vary a size of the second estimation area corresponding to at least one of a progressing direction, progressing speed, and input size of the second input information.

According to various embodiments of the present disclosure, the processor may allow a device having a relatively low priority to output at least one of visual information, audio information, and tactile information relating to an input limit of the device having the relatively low priority.

According to various embodiments of the present disclosure, the processor may set an authority relating to the sharing content operation of at least one communication-connected device, and when there is the collision occurrence possibility, output lock information for limiting an input of a device having a relatively low priority based on the sharing content operation authority to the at least one communication-connected device.

According to various embodiments of the present disclosure, when the collision occurrence possibility is released or removed, the processor may allow an output device that receives the lock information to output lock release information for releasing an input limit.

According to various embodiments of the present disclosure, the processor may allocate device specific sharing content portion areas, and if there is collision occurrence possibility in a specified sharing content portion area, output the lock information to a device where a specified sharing content portion area is not allocated.

According to various embodiments of the present disclosure, the processor may allocate device specific sharing content portion areas, set a collision determination area and a collision non-determination area among the sharing content portion areas, process the collision occurrence possibility in correspondence to the first input information and the second input information occurring in the collision determination area, and when the collision occurrence possibility occurs in the collision non-determination area, ignore the collision occurrence possibility.

Figure 8:
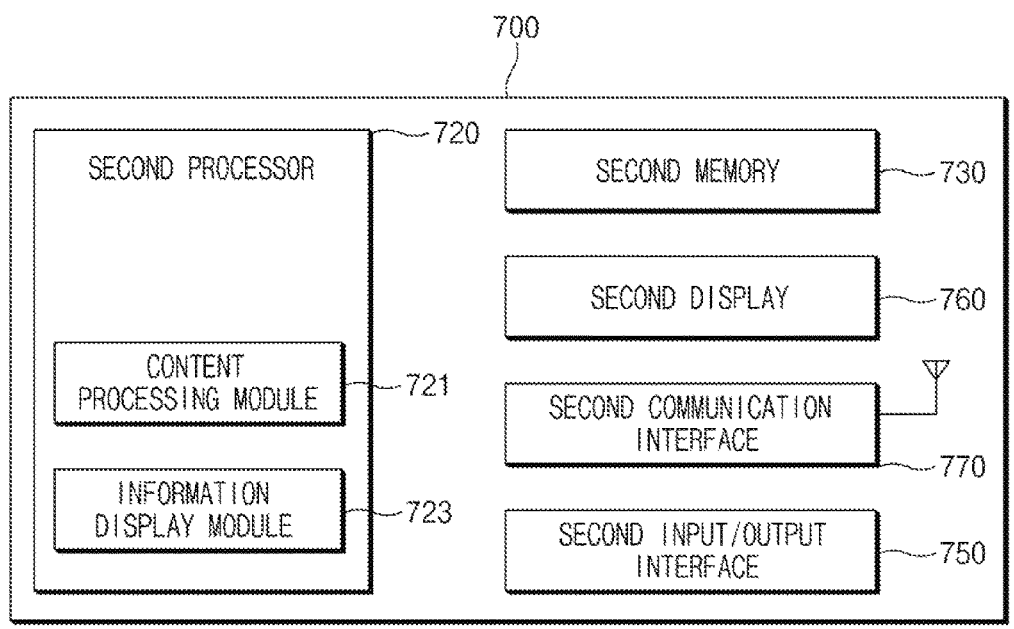
FIG. 8 is a view illustrating one example of a configuration of an external electronic device according to various embodiments of the present disclosure.

FIG. 8 is a view illustrating one example of a configuration of an external electronic device according to an embodiment of the present disclosure.

Referring to FIG. 8, an external electronic device 700 may include a second processor 720, a second memory 730, a second display 760, a second input/output interface 750, and a second communication interface 770.

The second processor 720 may perform at least one process relating to an operation of the external electronic device 700. According to an embodiment of the present disclosure, the second processor 720 may include a content processing module 721 and an information display module 723. For example, the content processing module 721 may receive a participation request message, and accept or reject the participation according to a user input. The information display module 723 may output the received sharing content to the second display 760. During this operation, at least part of a sharing content may be outputted according to an operation authority determined by role information. The content processing module 721 may generate and transmit input information according to a user input while the sharing content is outputted. The content processing module 721 may update the current sharing content by receiving an updated sharing content.

The content processing module 721 may receive lock information from the electronic device 600 or the server 800. In this case, the content processing module 721 may set an input limit according to a lock information reception. For example, the content processing module 721 may prevent an input in a lock-processed estimation area by performing lock processing on an estimation area. According to an embodiment of the present disclosure, the information display module 723 may output a specified effect for the lock-processed estimation area. For example, an input occurring from an estimation area may be processed to be invalid. Alternatively, the information display module 723 may display the lock-processed estimation area differently from a peripheral area. Alternatively, the information display module 723 may output at least one of an image and text for indicating lock processing in relation to an estimation area.

According to various embodiments of the present disclosure, the content processing module 721 may receive lock release information. When the lock release information is received, the content processing module 721 may release an input limit. During this operation, the information display module 723 may provide a specified effect (for example, at least one of an image or text for notifying lock release) according to the reception of the lock release information. Alternatively, the information display module 723 may display the lock-processed estimation area identically to a peripheral area by removing a specified effect applied to the lock-processed estimation area. According to various embodiments of the present disclosure, the information display module 723 may output, to an estimation area, a sharing content where input information inputted by the electronic device 600 or another external electronic device is applied. The content processing module 721 may update a previously stored sharing content by receiving only update information.

The second memory 730 may output at least one of an OS and at least one information relating to an operation of the external electronic device 700. According to an embodiment of the present disclosure, the second memory 730 may store sharing content. Additionally, the second memory 730 may update a previously stored sharing content by receiving an updated sharing content. Alternatively, the second memory 730 may update a previously stored sharing content based on update information generated from a sharing content where input information is applied.

The second display 760 may output a screen relating to an operation of the external electronic device 700. For example, the second display 760 may output a participation request reception screen relating to a sharing content operation and a participation acceptance screen according to a user input. Additionally, the second display 760 may output a sharing content output screen or a sharing content change screen (or an updated sharing content screen) where input information of the electronic device 600 or the external electronic device 700 is applied.

According to various embodiments of the present disclosure, the second display 760 may output a specified visual effect according to lock information reception. For example, the second display 760 may output at least one of an image and text for indicating a lock-processed estimation area. Alternatively, the second display 760 may highlight and output the lock processed estimation area. According to various embodiments of the present disclosure, when an input occurs in the lock-processed estimation area, the second display 760 may output a warning message for guiding input limit. According to various embodiments of the present disclosure, when receiving lock release information, the second display 760 may output a message for guiding the release of the lock-processed estimation area.

The second input/output interface 750 may receive a participation request acceptance input signal and a sharing content change related user input. The second input/output interface 750, for example, may include a touch screen, a touch panel, and an electromagnetic induction panel. Additionally, the second input/output interface 750 may include an audio device. The audio device may output at least one audio information relating to an sharing content operation (for example, audio information for guiding the reception of a participation request message, lock information reception related audio information, and lock release information reception related audio information) in correspondence to a corresponding event occurrence.

The second communication interface 770 may process the communication channel establishment of the external electronic device 700. For example, the second communication interface 770 may establish a communication channel with the electronic device 600 or the server 800 through the network 662. The second communication interface 770 may process participation request message reception, participation acceptance message transmission, and sharing content reception. Additionally, the second communication interface 770 may transmit input information according to a user input and receive update information or an updated sharing content from the electronic device 600 or the server 800. The second communication interface 770 may receive lock information or lock release information.

Although it is described above that the electronic device 600 including the components described with reference to FIG. 7 and the external electronic device 700 including the components described with reference to FIG. 8 are separately described, various embodiments of the present disclosure are not limited thereto. The electronic device 600 and the external electronic device 700 may include the same components and perform processing on sharing content. Alternatively, a configuration of the electronic device 600 and a configuration of the external electronic device 700 are included in the same one electronic device and each operating module may vary according to a role of a sharing content operation.

According to the above-mentioned various embodiments of the present disclosure, an electronic device may include a communication interface for receiving a sharing content, a display for outputting a sharing content related screen, an input interface for receiving sharing content operation related input information, a memory for storing at least one instruction relating to sharing content processing, and a processor electrically connected to the display, the input interface, the communication interface, and the memory, and the processor executed by the instruction may transmit the input information to an electronic device or server that operates the sharing content, and when input information related lock information is received from the electronic device or the server, limit the input of an estimation area according to the lock information.

According to various embodiments of the present disclosure, the processor may limit an input an estimation area corresponding to a stroke input.

According to various embodiments of the present disclosure, the processor may limit an object's movement to an estimation area according to a specified object's movement.

According to various embodiments of the present disclosure, the processor may perform support to allow a corresponding device to output at least one of visual information, audio information, and tactile information, which relate to the input limit.

According to various embodiments of the present disclosure, when lock release information corresponding to a case that the collision occurrence possibility is released or removed is received, the processor may release the input limit.

According to the various embodiments of the present disclosure, an electronic device may include: a display; a user input device (for example, at least one of the input/ output interface or a touch function display), which is integrated into the display or separated from the display, including a circuit for receiving a touch and/or gesture inputted from a user; a communication circuit (for example, the communication interface); a processor electrically connected to the display, the user input device, and the communication circuit; and a memory electrically connected to the processor. The memory may store instructions executed by the processor. The instructions may output a user interface of a software program on the display; receive a first gesture inputted from the user input device; display a first image (for example, sharing content) in correspondence to a first gesture input in a first area of the user interface; receive a second image (for example, indexed stroke data provided by an external electronic device or an image where the stroke data is applied) generated from another electronic device through a communication circuit; and when at least a part of the second image overlaps a first image, change or move at least the part of the second image that is disposed on or below the first image, or separated from the first image.

According to the various embodiments of the present disclosure, an electronic device may include: a display; a user input device (for example, at least one of the input/output interface or a touch function display), which is integrated into the display or separated from the display, including a circuit for receiving a touch and/or gesture inputted from a user; a communication circuit (for example, the communication interface); a processor electrically connected to the display, the user input device, and the communication circuit; and a memory electrically connected to the processor. The memory may store instructions executed by the processor. The instructions may output a user interface of a software program on the display; receive a first gesture inputted from the user input device; display a first image (for example, sharing content) in correspondence to a first gesture input in a first area of the user interface; receive a second image generated from another electronic device through the communication circuit; transmit information on the first image or a part of the first image through the communication circuit; and perform an adjustment to dispose at least a part of the second image on or below the first image, or separate at least the part of the second image from the first image.

Figure 9:
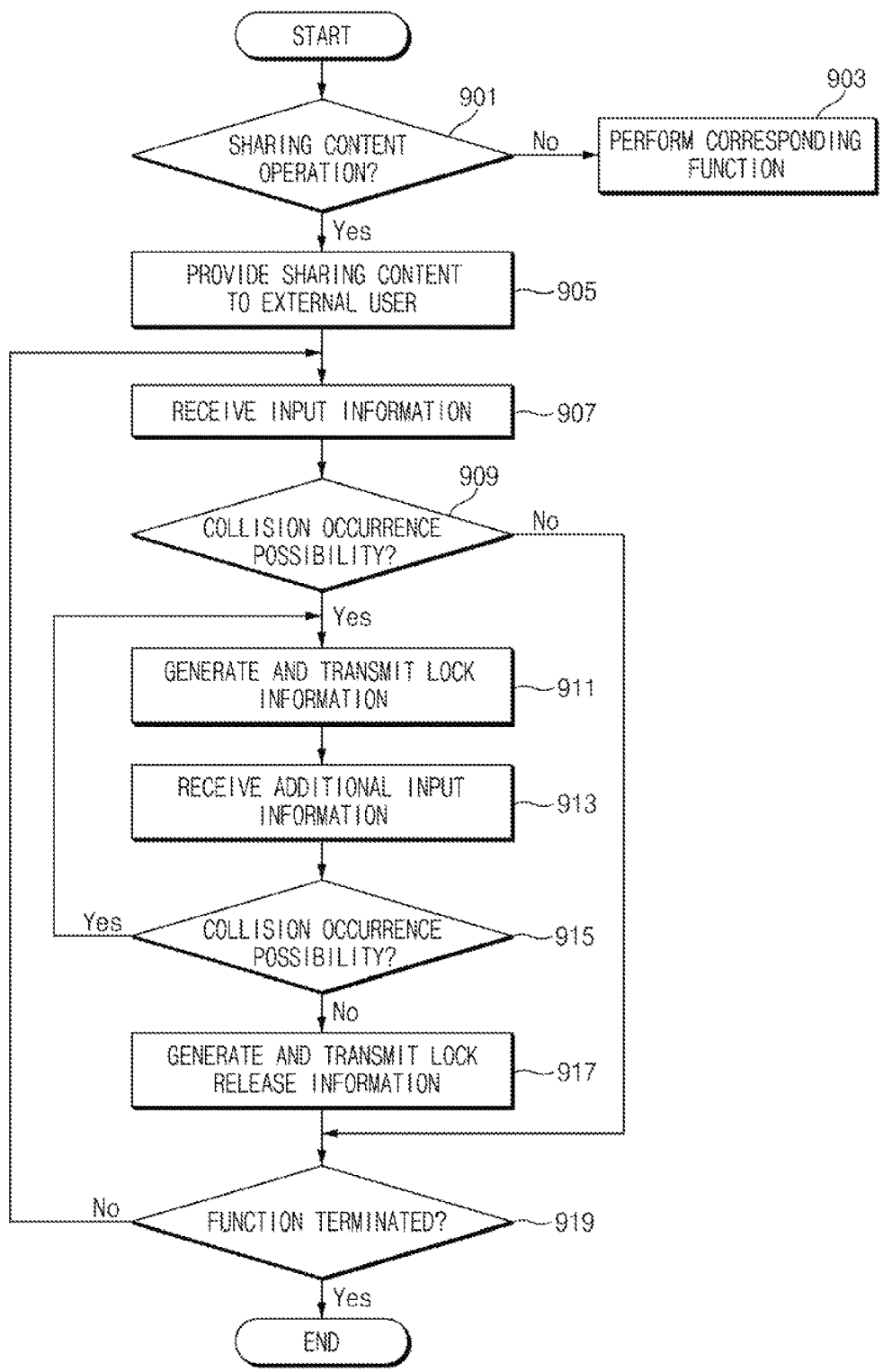
FIG. 9 is a view illustrating an electronic device operating method relating to a sharing content operation according to various embodiments of the present disclosure.

FIG. 9 is a view illustrating an electronic device operating method relating to a sharing content operation according to an embodiment of the present disclosure.

Referring to FIG. 9, in relation to a sharing content operation, when an event relating to an operation of the electronic device 600 occurs (for example, an input event occurs from the first input/output interface 650 or the first display 660), in operation 901, the electronic device 600 (for example, the processor 620) may check whether a sharing content operation related event occurs. In relation to this, the first processor 620 (for example, the sharing task processing module 621) may output a sharing content operation related icon or menu to the first display 660. Alternatively, the first processor 620 may provide a sharing content operation function from a text editor or a gallery function. If a sharing content operation related event does not occur, in operation 903, the first processor 620 may perform a function according to the type of the occurred event. For example, the first processor 620 may perform a web surfing function and a text editing function according to the event type.

If a sharing content operation related event occurs, in operation 905, the first processor 620 (for example, the sharing task processing module 621) may operate the first communication interface 670 to provide sharing content to a specified external electronic device 700. For example, the first processor 620 may transmit sharing content to an external electronic device according to a user selection or an external electronic device included in an operation history of the sharing content through the first communication interface 670. Alternatively, according to user permission, the first processor 620 may provide sharing content to the external electronic device 700 that requests the participation, through the first communication interface 670.

In operation 907, the first processor 620 may receive input information from the external electronic device 700 based on the first communication interface 670. The first processor 620 may collect the received input information and input information (or input information inputted by a user in relation to a sharing content change) inputted through the first input/output interface 650 (or the first display 660 with a touch function).

In operation 909, the first processor 620 (for example, the collision processing module 623) may check collision occurrence possibility. If there is no collision occurrence possibility, the first processor 620 may omit the following operation and branch into operation 919 after processing the received input information. During this operation, the first processor 620 may check whether a sharing content area where input information is applied is a collision occurrence determination area (for example, an area set to determine whether collision occurs) or a collision occurrence non-determination area (for example, an area set not to determine where collision occurs). When it is determined as a collision occurrence determination area, the first processor 620 may duplicately apply the received input information to a corresponding sharing content area (for example, update the content 631 stored in the first memory 630).

If there is collision occurrence possibility, in operation 911, the first processor 620 may generate lock information and transmit the generated lock information to the external electronic device 700. During this operation, the electronic device 600 may be a device having a relatively high operation authority (or a relatively high priority) in comparison to the external electronic device 700. According to various embodiments of the present disclosure, when the electronic device 600 has a relatively lower operation authority than the external electronic device 700, the first processor 620 of the electronic device 600 may generate lock information for limiting its input while generating the lock information. Alternatively, the electronic device 600 may be a device set with a relatively lower operation authority (or set with a lower priority) than the external electronic device 700. In this case, the first processor 620 of the electronic device 600 may generate lock information to be transmitted to the external electronic device 700. According to various embodiments of the present disclosure, the first processor 620 may transmit a message for guiding that the lock information is generated and applied, to the external electronic device 700 through the first communication interface 670.

In operation 913, the first processor 620 may receive additional input information from the external electronic device 700 based on the first communication interface 670. During this operation, the first processor 620 may collect input information (or maintain previous input information) inputted by itself through the first input/output interface 650 or the first display 660 and may collect additional input information provided by an external electronic device through the first communication interface 670.

In operation 915, the first processor 620 may check whether there is collision occurrence possibility according to the additional input information. For example, the first processor 620 may check whether there is collision occurrence possibility between the additional input information and the currently inputted input information. If there is collision occurrence possibility, the first processor 620 may branch into operation 911 and re-perform subsequent operations. When the collision occurrence possibility is released (or removed), in operation 917, the first processor 620 may generate and transmit lock release information. During this operation, if having a relatively lower operation authority than the external electronic device 700, the first processor 620 may apply the lock release information to itself (for example, release an input limit). According to various embodiments of the present disclosure, the first processor 620 may transmit a message for guiding the lock release information application, to the external electronic device 700. Additionally, the first processor 620 may perform sharing content update according to additional input information. The first processor 620 may provide the updated sharing content to the external electronic device 700.

In operation 919, the first processor 620 may check whether a function termination related event occurs. If there is no function termination related event, the first processor 620 may branch into operation 907 and re-perform subsequent operations. If a function termination related event occurs, the first processor 620 may terminate the sharing content operation. According to various embodiments of the present disclosure, when terminating the sharing content operation, the first processor 620 may store a list of collaborating external electronic devices in the first memory 630 in relation to collaborative sharing content.

According to various embodiments of the present disclosure, an electronic device operating method may include collecting first input information inputted in relation to a sharing content operation and second input information from the at least one external electronic device in relation to the sharing content operation, determining collision occurrence possibility of the first input information and the second input information, and applying a specified effect corresponding to the collision occurrence possibility.

According to the various embodiments of the present disclosure, a sharing content operating method may include: collecting, by an electronic device, first input information inputted from the electronic device in relation to a sharing content operation and second input information from at least one external electronic device in relation to the sharing content operation; determining, by the electronic device, whether a first object displayed on a display in correspondence to the first input information collides with a second object displayed on the display in correspondence to the second input information; and outputting, by the electronic device with collision occurrence possibility, a specified display effect.

According to various embodiments of the present disclosure, the determining of whether the first object collides with the second object may include: calculating a first estimation area of a display relating to the first input information based on at least one of a progressing direction, progressing speed, and input size of the first input information; calculating a second estimation area of a display relating to the second input information based on at least one of a progressing direction, progressing speed, and input size of the second input information; and when at least a part of the first estimation area and the second estimation area is overlapped, determining that there is collision occurrence possibility.

According to various embodiments of the present disclosure, the outputting of the specified display effect may include at least one of: outputting information for guiding collision occurrence possibility to an estimation area of a display relating to input information of a device having a relatively low priority; and outputting identification information of at least one colliding device to at least one of the first estimation area and the second estimation area.

According to various embodiments of the present disclosure, the determining that there is the collision occurrence possibility may include calculating the first estimation area or the second estimation area corresponding to a stroke input or calculating a first estimation area according to a movement of the first object or a second estimation area according to a movement of the second object.

According to various embodiments of the present disclosure, the determining that there is the collision occurrence possibility may include: varying a size of the first estimation area corresponding to at least one of the progressing direction, progressing speed, and input size of the first input information; and varying a size of the second estimation area corresponding to at least one of the progressing direction, progressing speed, and input size of the second input information.

According to various embodiments of the present disclosure, the outputting of the specified display effect may include at least one of: moving an object corresponding to input information relating to a device having a relatively low priority in a specified direction; or allowing a corresponding device having a relatively low priority to output at least one of visual information, audio information, and tactile information relating to an input limit of a device having a relatively low priority.

According to various embodiments of the present disclosure, the method may further include setting a sharing content operation authority for each communication-connected device, wherein the outputting of the specified display effect may include allowing a device having a relatively low priority to output lock information for limiting an input of a device having a relatively low priority based on the sharing content operation authority.

According to various embodiments of the present disclosure, the outputting of the specified display effect may include, when the collision occurrence possibility is released or removed, outputting lock release information for releasing an input limit to a device for receiving the lock information.

According to various embodiments of the present disclosure, the method may further include allocating the device specific sharing content portion areas, wherein the outputting of the specified display effect may include, if there is collision occurrence possibility in a specified sharing content portion area, outputting the lock information to a device where a specified sharing content portion area is not allocated.

According to various embodiments of the present disclosure, when the external electronic device has a relatively lower priority than the electronic device, the method may further include transmitting the lock information to the external electronic device.

According to various embodiments of the present disclosure, the method may further include setting a collision determination area and a collision non-determination area among the sharing content areas, and processing the collision occurrence possibility in correspondence to the first input information and second input information occurring in a collision determination area.

Figure 10:
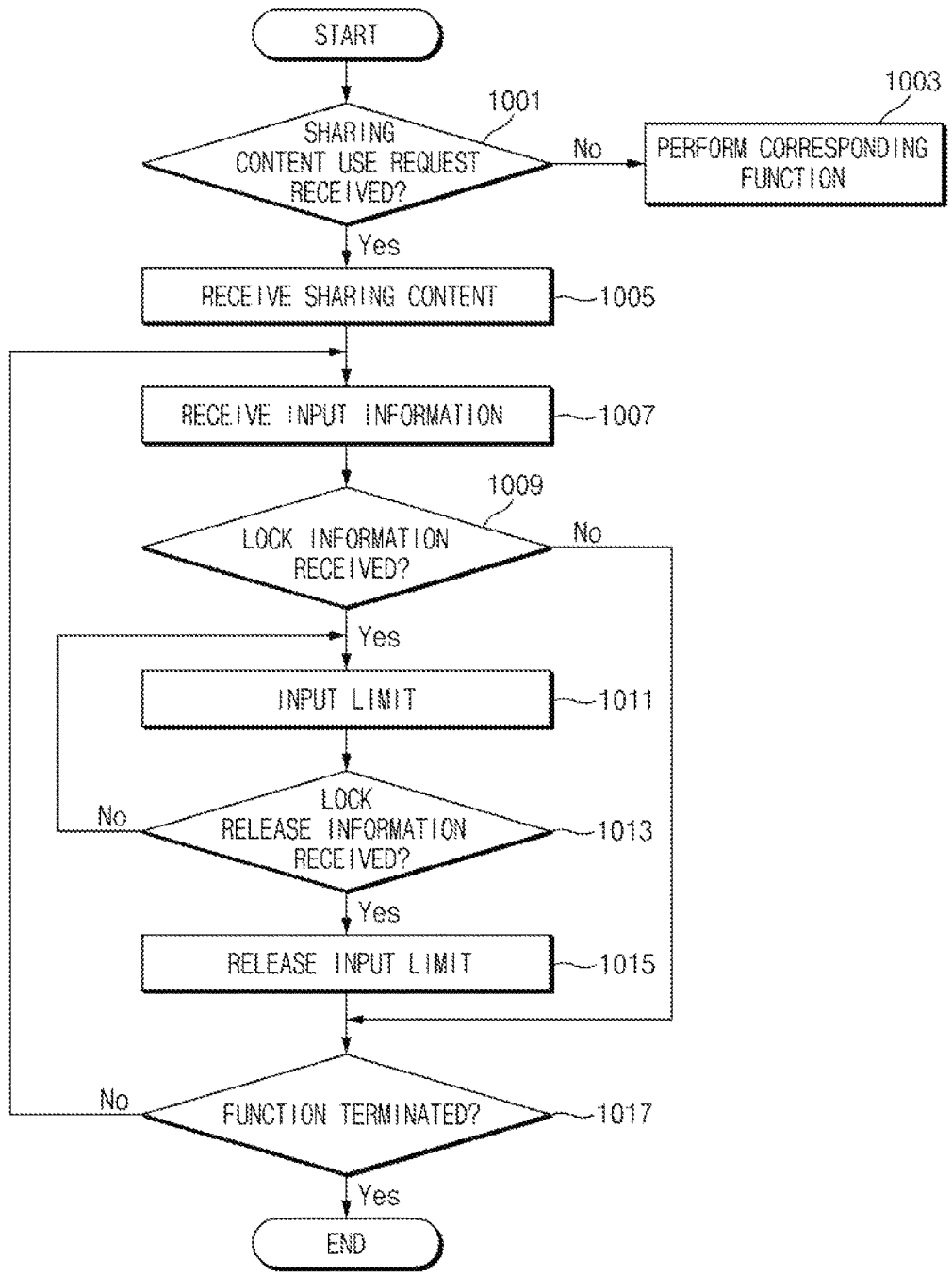
FIG. 10 is a view illustrating an external electronic device operating method relating to a sharing content operation according to various embodiments of the present disclosure.

FIG. 10 is a view illustrating an external electronic device operating method relating to a sharing content operation according to an embodiment of the present disclosure. FIG. 10 may be one example of an operation of the external electronic device 700 that receives a sharing content operation request from the electronic device 600 and processes a sharing content operation in correspondence to a user input.

Referring to FIG. 10, in relation to a sharing content operation, when an event occurs, in operation 1001, the second processor 720 of the external electronic device 700 may check whether the event is a sharing content participation request received through the second communication interface 770. If not a sharing content participation request reception event, in operation 1003, the second processor 720 may perform a function according to an event type. For example, the second processor 720 may perform a file editing function, a gallery function, a camera function, and a web surfing function according to the event type.

When a sharing content participation request related event is received, in operation 1005, the second processor 720 may receive sharing content through the second communication interface 770 according to a user input (for example, sharing content participation request permission). According to various embodiments of the present disclosure, if sharing content has a previous history of collaboration, the second processor 720 may operate a sharing content lastly stored in the second memory 730.

In operation 1007, the second processor 720 may receive input information according to a user input through the second input/output interface 750 (or the second display 760 having a touch function), and transmit the received input information to the electronic device 600 based on the second communication interface 770. According to various embodiments of the present disclosure, the second processor 720 may collect sharing content based input information based on the second input/output interface 750 or the second display 760. For example, the second processor 720 may collect location information where input information is applied and information such as an input type and an input form, and transmit the collected information to the electronic device 600 through the second communication interface 770.

In operation 1009, the second processor 720 may check whether there is lock information reception through the second communication interface 770. If there is no lock information reception, in correspondence to input information transmission, the second processor 720 may receive an updated sharing content from the electronic device 600 through the second communication interface 770 and synchronize the updated sharing content and the sharing content stored in the second memory 730. Then, the second processor 720 may branch into operation 1017.

If lock information is received, in operation 1011, the second processor 720 may limit an input function of the second input/output interface 750 or the second display 760. For example, the second processor 720 may limit an input function of the second display 760 or the second input/output interface 750 in order to prevent an input in an estimation area of the display 760 indicated in the lock information. Additionally, the second processor 720 may output a specified effect, which indicates a lock processed estimation area occurrence, to the second display 760.

In operation 1013, the second processor 720 may check whether there is lock release information reception through the second communication interface 770. If there is no lock release information reception, the second processor 720 may branch into operation 1011 and maintain an input limit state of at least one of the second display 760 and the second input/output interface 750. If lock release information is received, in operation 1015, the second processor 720 may release an input limit of at least one of the second display 760 and the second input/output interface 750.

In operation 1017, the second processor 720 may check whether function termination event occurs. When a function termination event occurs according to a user input, the second processor 720 may transmit a participation termination message to the electronic device 600. The sharing content operating function may be terminated according to the participation termination acceptance of the electronic device 600 or according to a user's termination request. According to various embodiments of the present disclosure, when receiving a function termination event from the electronic device 600, the second processor 720 may terminate a sharing content operation. Alternatively, when receiving a function termination event from the electronic device 600, the second processor 720 may continuously perform a sharing content operating function based on the remaining devices except for the electronic device 600.

According to the various embodiments of the present disclosure, an external electronic device operating method may include transmitting input information relating to a sharing content operation to an electronic device or server that operates the sharing content, receiving lock information relating to the input information from the electronic device or the server, and limiting an input of an estimation area (or a predetermined area of sharing content) according to the lock information.

According to various embodiments of the present disclosure, the limiting of the input may include at least one of limiting an input of an estimation area corresponding to a stroke input and limiting a specified object's movement to an estimation area according to a movement of the specified object.

According to various embodiments of the present disclosure, the method may further include outputting at least one of visual information, audio information, and tactile information, which relate to the input limit.

According to various embodiments of the present disclosure, the method may further include receiving lock release information corresponding to a case that the collision occurrence possibility is released or removed, and releasing the input limit.

According to the various embodiments of the present disclosure, an electronic device operating method may include: outputting a user interface of a software program on a display; receiving a first gesture inputted from a user input device; displaying a first image (for example, sharing content) corresponding to a first gesture input in a first area of the user interface; receiving a second image (for example, indexed stroke data provided by an external electronic device or an image where the stroke data is applied) generated from another electronic device through a communication circuit; and when at least a part of the second image overlaps the first image, changing or moving the at least a part of the second image disposed on or below the first image or separated from the first image.

According to the various embodiments of the present disclosure, an electronic device operating method may include: outputting a user interface of a software program on a display; receiving a first gesture inputted from the user input device; displaying a first image (for example, sharing content) corresponding to a first gesture input in a first area of the user interface; receiving a second image generated from another electronic device; transmitting information on a first image or a first part to the outside of the electronic device through the communication circuit; receiving a second image generated by another electronic device through the communication circuit; and performing adjustment to allow at least part of the second image to be disposed on or below a first image or separated from the first image.

Figure 11:
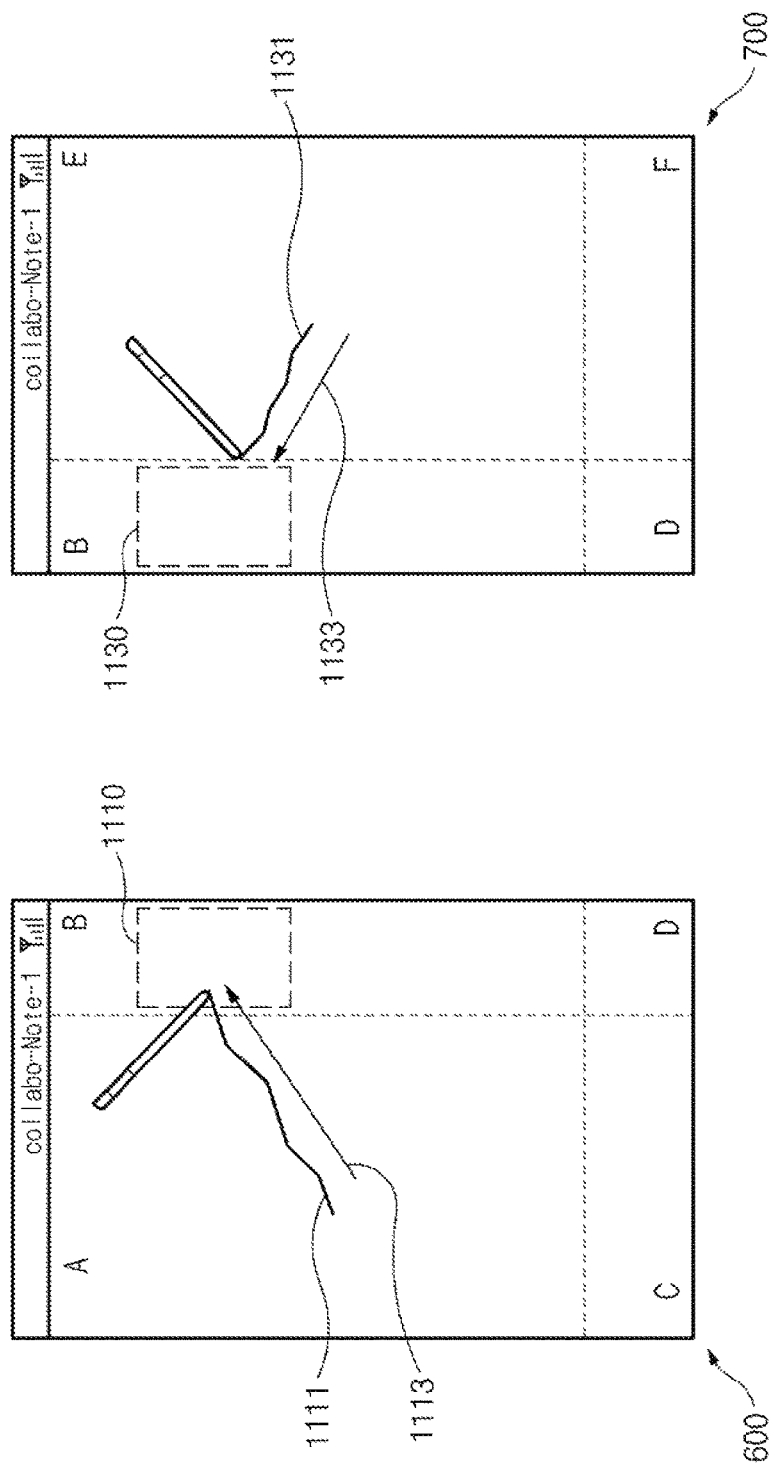
FIG. 11 is a view illustrating one example of a sharing content operation related screen interface according to various embodiments of the present disclosure.

FIG. 11 is a view illustrating one example of a sharing content operation related screen interface according to an embodiment of the present disclosure.

Referring to FIG. 11, the electronic device 600 and the external electronic device 700 may perform a stroke input related sharing content operation and collision processing.

For example, the electronic device 600, as shown in a state 1101, may output a sharing content screen. The sharing content screen, for example, may include sharing content areas A, B, C, D, E, and F allocated to a plurality of external electronic devices. The sharing content area A may be allocated to the electronic device 600. The sharing content area A, for example, may be an area having an operation authority of a relatively high priority. Alternatively, the sharing content area A may be a sharing area of the electronic device 600. The sharing area, for example, may be an area where only the electronic device 600 inputs input information. The sharing content area B, for example, may be an area where input information of another external electronic device 700 is applied together.

The electronic device 600 may output a first stroke 1111 to the sharing content area A of the first display 160 according to first input information corresponding to a user input. During this operation, the electronic device 600 may receive second input information from the external electronic device 700 according to a user input. When it is determined that there is no collision occurrence possibility between the second information occurring from the sharing content area E and the first input information, the electronic device 600 may apply the received first input and second input information to a sharing content and output it. According to an embodiment of the present disclosure, if scroll for outputting the sharing content area E occurs in the state 1101, the first display 160 may output a screen where a second stroke 1131 is applied according to second input information.

According to various embodiments of the present disclosure, as shown in a state 1103, the external electronic device 700 may output the second stroke 1131 to the second display 760 according to the second input information corresponding to a user input of the external electronic device 700. In relation to this, the external electronic device 700 may transmit the second input information to the electronic device 600 and output a sharing content screen by receiving update information from the electronic device 600.

In relation to collision processing, the electronic device 600 may calculate a first input information related first estimation area 1110 based on at least one of the progressing direction, progressing speed, and input size of the first input information. Additionally, the electronic device 600 may calculate a second estimation area 1130 by analyzing second input information received from the external electronic device 700. When the first estimation area 1110 and the second estimation area 1130 overlap in the sharing content area E (for example, a collision occurrence determination area), the electronic device 600 may determine that there is collision occurrence possibility.

Accordingly, the electronic device 600 may generate lock information on the first estimation area 1110 and transmit it to the external electronic device 700. The electronic device 600 may output a specified effect (for example, information for guiding collision occurrence possibility) in relation to the lock-processed first estimation area 1110. Herein, when the electronic device 600 has a relatively higher priority than the external electronic device 700, an input function of the electronic device 600 with respect to the first estimation area 1110 may be guided. Additionally, the electronic device 600 may guide which external electronic device 700 is to perform an input with respect to the first estimation area 1110.

The external electronic device 700 may lock-process the second estimation area 1130 in correspondence to lock information reception. Additionally, the external electronic device 700 may output a specified effect (for example, an effect for guiding lock processing) with respect to the second estimation area 1130. Additionally, the external electronic device 700 may output identification information of a device (for example, the electronic device 600) having an operation authority in the second estimation area 1130. Accordingly, a user of the external electronic device 700 may check which user has an operation authority for a second estimation area.

According to various embodiments of the present disclosure, as soon as the sharing content area E is allocated in correspondence to role information of the external electronic device 700 and the first input information of the electronic device 600 occurs in a predetermined area of the sharing content area E, second input information of the external electronic device 700 may occur in a predetermined area of the sharing content area E. Herein, when a first input information related estimation area and a second input information related estimation area occur, a priority of the external electronic device 700 may be set to be relatively high based on role information (because the sharing content area E is allocated to the external electronic device 700). In this case, an input of the electronic device 600 may be limited.

An input of a device set with a relatively low priority may be limited according to role information in a sharing content area not allocated to the electronic device 600 and the external electronic device 700 but allocated to another external electronic device, for example, areas C and F or a joint use area D.

In relation to the input limit, as a stroke input approaches an estimation area, a device (for example, the electronic device 600 or the external electronic device 700) where lock information is applied may ignore the stroke input or process it to be transparent gradually. According to an embodiment of the present disclosure, as a stroke input approaches an estimation area, a device having applied lock information may increase the transparency of the stroke input and when the stroke input enters the estimation area, process the stroke input to be transparent completely. Additionally, as the stroke input is away from the estimation area, the device having applied lock information may process an object displayed by the stroke input to have an original color.

According to various embodiments of the present disclosure, the electronic device 600 may determine collision occurrence based on an estimation direction line 1113 corresponding to first input information and an estimation direction line 1133 corresponding to second input information. For example, the electronic device 600 may check whether a virtual extension line of the estimation direction line 113 and a virtual extension line of the estimation direction line 1133 overlap at a predetermined time point. When an overlapping point is within a specified distance from the position of the current input information, the electronic device 600 may determine it as collision occurrence.

Figure 12:
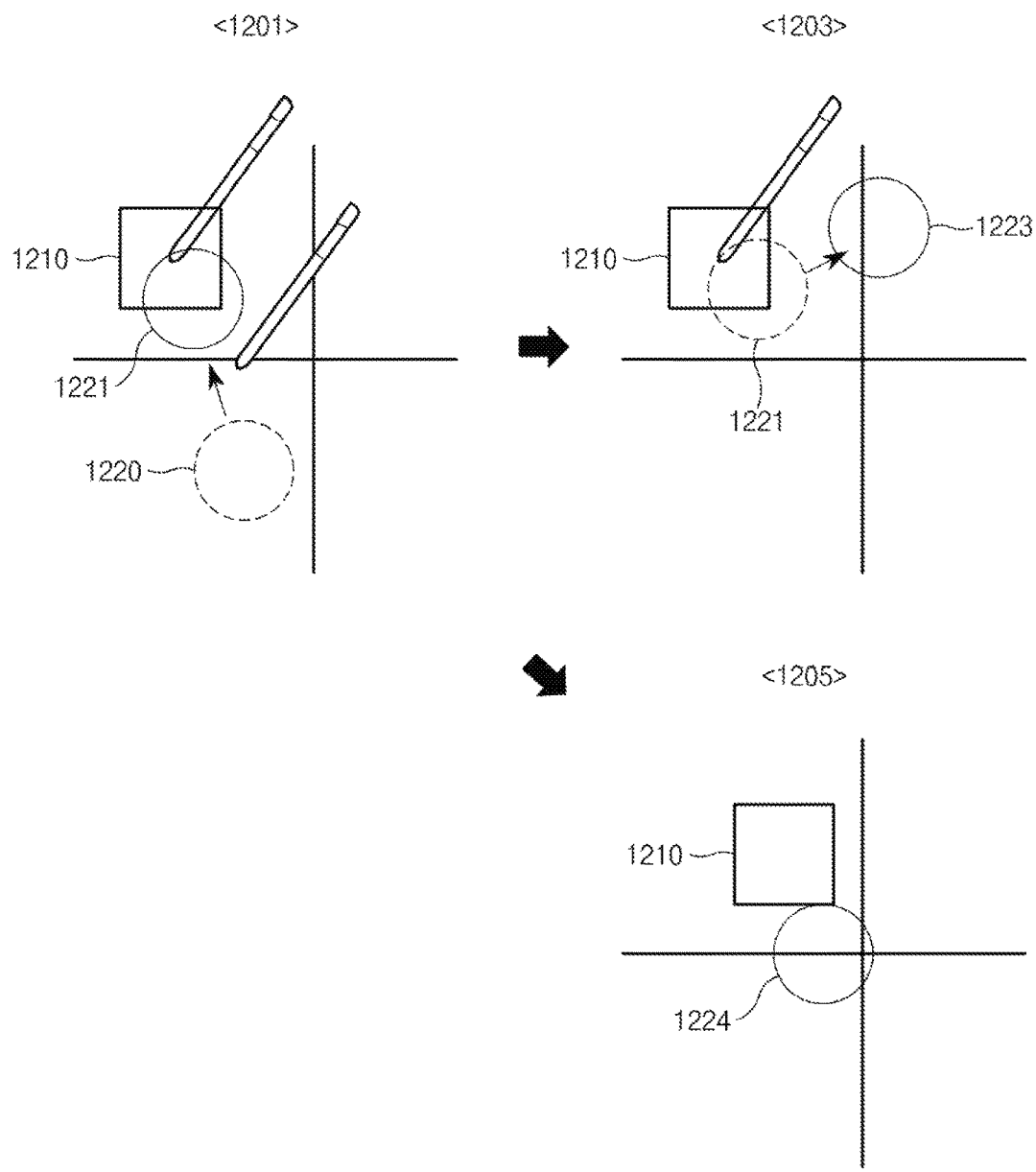
FIG. 12 is a view illustrating another example of a sharing content operation related screen interface according to various embodiments of the present disclosure.

FIG. 12 is a view illustrating another example of a sharing content operation related screen interface according to an embodiment of the present disclosure.

Referring to FIG. 12, the electronic device 600 and the external electronic device 700 may perform an object movement input related sharing content operation and collision processing.

For example, a sharing content area may be allocated to four areas. According to an embodiment of the present disclosure, the first quadrant and the fourth quadrant may be allocated to the electronic device 600 and the second quadrant and the fourth quadrant may be allocated to the external electronic device 700. As shown in a state 1201, a first object 1210 may be displayed in the first quadrant according to an input of the electronic device 600. Additionally, a second object 1220 may be displayed in the third quadrant according to an input of the external electronic device 700. Alternatively, the sharing content may correspond to a screen including the first object 1210 and the second object 1220.

A user input relating to a movement of the second object 1220 may be inputted from the external electronic device 700. For example, the second object 1220 may move toward the first object 1210. When it is predicted that the second object 1220 moves and overlap at least a part of the first object 1210, for example, the electronic device 600 may predict that the first object 1210 collides with the second object 1221 to be moved. In this case, the electronic device 600, as shown in a state 1203, may move the movement-predicted second object 1221 to a specified position and display it in order to prevent the collision of the movement-predicted second object 1221 (for example, an estimation area) and the first object 1210. For example, the movement-predicted second object 1221 may be moved to a specified position 1223 and displayed. During this operation, the electronic device 600 may move the movement-predicted second object 1221 to a quadrant (for example, the second quadrant) relating to the external electronic device 700 and display it.

According to various embodiments of the present disclosure, in relation to collision processing, the electronic device 600 may display the second object 1220 in a minimum area that does not overlap the first object 1210. For example, as shown in a state 1205, the electronic device 600 may display the boundary line of the first object 1210 and the boundary line of the movement-limited second object 1224 to meet each other. When input information in a form that the movement-limited second object 1224 moves toward and overlaps the first object 1210 occurs additionally, the electronic device 600 may transmit input limit related lock information and effect information to the external electronic device 700. In the above operation, the electronic device 600 may output at least one image or text corresponding to collision occurrence. Additionally, the electronic device 600 may output identification information for identifying which one of the second objects 1220, 1223, and 1224 an object of the external electronic device 700 corresponds to.

As mentioned above, according to various embodiments of the present disclosure, a sharing content operating method and device, for example, may support a handwriting document co-editing function. Such a sharing content operating method and device may determine collision when a plurality of users edit a document simultaneously and avoid collision by limiting an input according to specific conditions. In relation to collision determination, the method and device may divide an area where a stroke or an object is created and after checking whether a simultaneous task is performed within the divided area, determine collision in consideration of a movement direction and speed. In relation to collision processing, the method and device may set an operation authority of a sharing content differently based on a role (for example, setting a user registered in contact information or a user device grouped into a specific group with a relatively high priority, user relationship, and document authority).

According to various embodiments of the present disclosure, in relation to a subject of collision determination, an electronic device (or a specified electronic device) that requests a sharing content operation may determine collision and deliver collision determination data to another device through a server. Then, the electronic device may deliver inputted input information (for example, stroke information) to a server and perform the synchronization of a sharing content. According to various embodiments of the present disclosure, when a server determines collision by analyzing input information inputted by devices and delivers a determination result to each device, each device may provide a sharing content where input information according to collision determination is applied, to the server.

According to various embodiments of the present disclosure, in relation to collision determination related data processing, an electronic device may directly generate input information for collision determination (for example, stroke data) and determine whether to deliver the input information to an external electronic device (whether to bypass a server); an electronic device may update the input information to a server as it is (that is, raw data); and the server may generate data for determining collision and transmit the generated data to an external electronic device.

According to various embodiments of the present disclosure, the sharing content, for example, may exist in only a server and devices may receive the sharing content from the server and operate it. Alternatively, sharing content update may be performed by storing the copy of the sharing content in an electronic device and providing collision avoidance related data to a server.

According to various embodiments of the present disclosure, an electronic device may include a display, a user input device (for example, an input/output interface separated from the display or the display with an input function) including a circuit for receiving a touch or gesture input from a user, a communication interface, a processor for electrically connecting the display with a user interface and a communication interface, and a memory electrically connected to the processor.

Instructions stored in the memory may display a user interface of a software program on a display when the processor is executed, receive a first gesture input from the user input device, display a first image corresponding to a first gesture input in a first part of a user input, and when a second image, which overlaps at least a part of the first image and is generated from an external electronic device, is received through a communication interface, move or change at least a part of the second image overlapping the first image.

According to various embodiments of the present disclosure, an electronic device may include a display, a communication interface, a user input device, a memory, and a processor, and instructions stored in the memory may transmit information on a part of the first image through the communication interface when the processor is executed and receive a second that is changed not to overlap at least a part of the first image.

Figure 13:
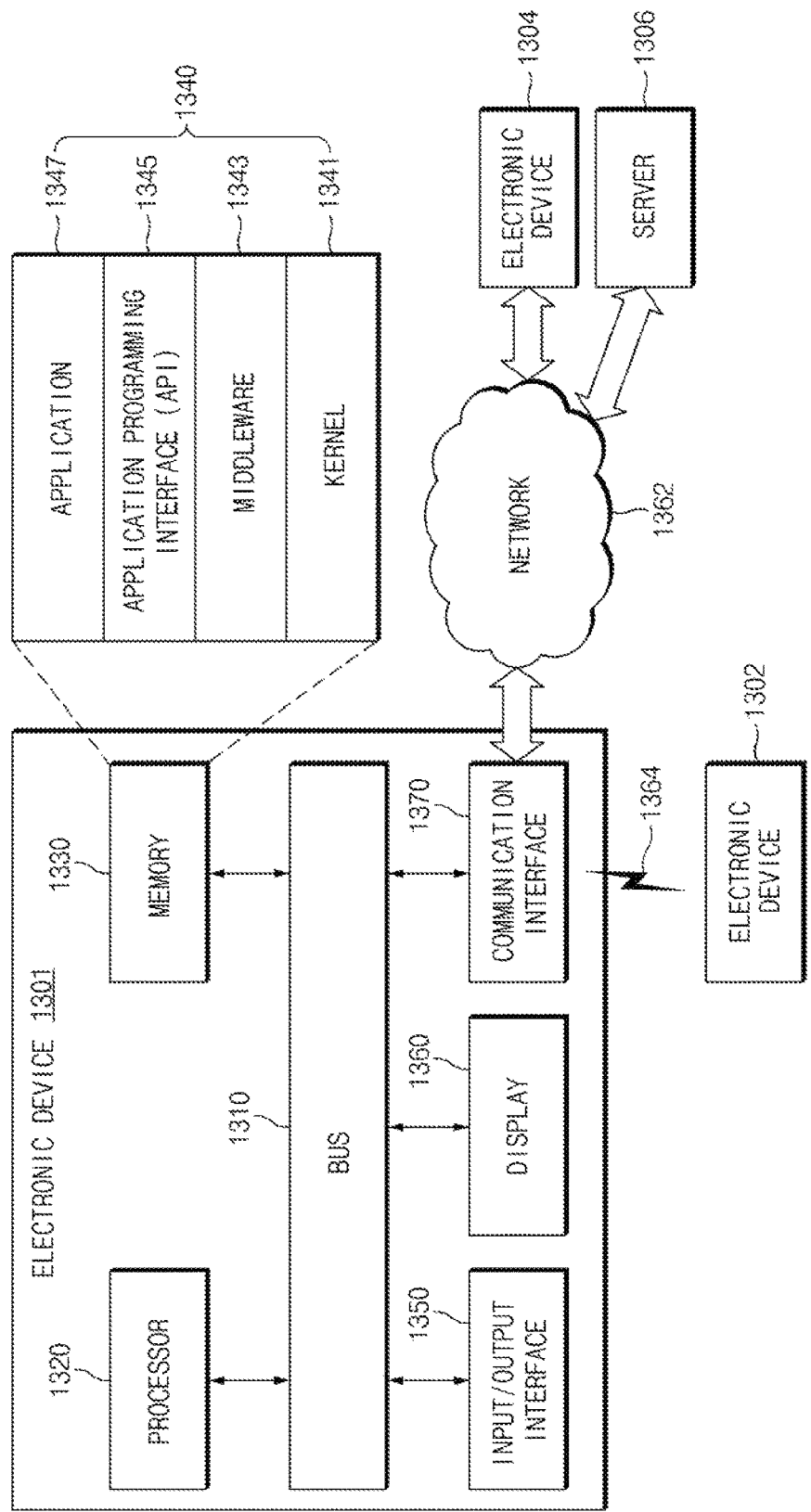
FIG. 13 is a view illustrating an electronic device operating environment according to various embodiments of the present disclosure.

FIG. 13 is a view illustrating an electronic device operating environment according to an embodiment of the present disclosure.

Referring to FIG. 13, according to various embodiments of the present disclosure, electronic devices 1301, 1302, and 1304 and a server 1306 may be connected to each other through a network 1362 or a short-range communication 1364. The electronic device 1301 may include a bus 1310, a processor 1320, a memory 1330, an input/output interface 1350, a display 1360, and a communication interface 1370. According to an embodiment of the present disclosure, the electronic device 1301 may omit at least one of the components or may additionally include a different component.

The bus 1310, for example, may include a circuit for connecting the components 1310 to 1370 to each other and delivering a communication (for example, control message and/or data) therebetween.

The processor 1320 may include at least one of a CPU, an AP, and a communication processor (CP). The processor 1320, for example, may execute calculation or data processing for control and/or communication of at least one another component of the electronic device 1301.

The memory 1330 may include volatile and/or nonvolatile memory. The memory 1330, for example, may store instructions or data relating to at least one another component of the electronic device 1301. According to various embodiments of the present disclosure, the memory 1330 may store software and/or a program 1340. The program 1340 may include a kernel 1341, a middleware 1343, an application programming interface (API) 1345, and/or an application program (or an application) 1347. At least part of the kernel 1341, the middleware 1343, and the API 1345 may be called an OS.

The kernel 1341, for example, may control or manage system resources (for example, the bus 1310, the processor 1320, the memory 1330, and so on) used for performing operations or functions implemented in other programs (for example, the middleware 1343, the API 1345, or the application program 1347). Additionally, the kernel 1341 may provide an interface for controlling or managing system resources by accessing an individual component of the electronic device 1301 from the middleware 1343, the API 1345, or the application program 1347.

The middleware 1343, for example, may serve as an intermediary role for exchanging data as the API 1345 or the application program 1347 communicates with the kernel 1341.

Additionally, the middleware 1343 may process at least one job request received from the application program 1347 according to a priority. For example, the middleware 1343 may assign to at least one application program 1347 a priority for using a system resource (for example, the bus 1310, the processor 1320, or the memory 1330) of the electronic device 1301. For example, the middleware 1343 may perform scheduling or load balancing on the at least one job request by processing the at least one job request according to the priority assigned to the at least one job request.

The API 1345, as an interface for allowing the application program 1347 to control a function provided from the kernel 1341 or the middleware 1343, may include at least one interface or function (for example, an instruction) for file control, window control, image processing, or character control.

The input/output interface 1350, for example, may serve as an interface for delivering instructions or data inputted from a user or another external device to another component(s) of the electronic device 1301. Additionally, the input/output interface 1350 may output instructions or data received from another component(s) of the electronic device 1301 to a user or another external device.

The display 1360, for example, may include a LCD, a LED display, an OLED display, a microelectromechanical systems (MEMS) display, or an electronic paper display. The display 1360 may display various content (for example, text, image, video, icon, symbol, and so on) to a user. The display 1360 may include a touch screen, and for example, may receive a touch, gesture, proximity, or hovering input by using an electronic pen or a user's body part.

The communication interface 1370, for example, may set a communication between the electronic device 1301 and an external device (for example, the first external electronic device 1302, the second external electronic device 1304, or the server 1306). For example, the communication interface 1370 may communicate with an external device (for example, the second external electronic device 1304 or the server 1306) in connection to the network 1362 through wireless communication or wired communication.

The wireless communication, as a cellular communication protocol, may use at least one of long-term evolution (LTE), LTE-advanced (LTE-A), code division multiple access (CDMA), wideband CDMA (WCDMA), universal mobile telecommunications system (UMTS), wireless broadband (WiBro), global system for mobile communications (GSM), and so on. Additionally, the wireless communication, for example, may include the short-range communication 1364. The short-range communication 1364, for example, may include at least one of Wi-Fi, Bluetooth (BT), near field communication (NFC), magnetic stripe transmission (MST), or GNSS.

The MST may generate pulses by using magnetic signals according to transmission data and the pulses may generate magnetic signals. The electronic device 1301 may transmit the magnetic signals to a POS and the POS may detect the magnetic signals by using an MST reader and restore the data by converting the detected magnetic signals into electrical signals.

The GNSS may include at least one of global positioning system (GPS), Glonass, Beidou navigation satellite system (hereinafter referred to as Beidou), and Galileo, that is, the European global satellite-based navigation system. Hereinafter, GPS and GNSS may be interchangeably used. The wired communication, for example, may include at least one of universal serial bus (USB), high definition multimedia interface (HDMI), recommended standard 232 (RS-232), and plain old telephone service (POTS). The network 1362 may include telecommunications network, for example, at least one of computer network (for example, local area network (LAN) or wide area network (WAN)), Internet, and telephone network.

Each of the first and second external electronic devices 1302 and 1304 may be the same or different type of the electronic device 1301. According to an embodiment of the present disclosure, the server 1306 may include a group of one or more servers. According to various embodiments of the present disclosure, all or part of operations executed on the electronic device 1301 may be executed on another one or more electronic devices (for example, the electronic device 1302 or 1304 or the server 1306). According to an embodiment of the present disclosure, when the electronic device 1301 performs a certain function or service automatically or by a request, it may request at least part of a function relating thereto from another device (for example, the electronic device 1302 or 1304 or the server 1306) instead of or in addition to executing the function or service by itself. The other electronic device (for example, the external electronic device 1302 or 1304 or the server 1306) may execute a requested function or an additional function and may deliver an execution result to the electronic device 1301. The electronic device 1301 may provide the requested function or service as it is or by processing the received result additionally. For this, for example, cloud computing, distributed computing, or client-server computing technology may be used.

Figure 14:
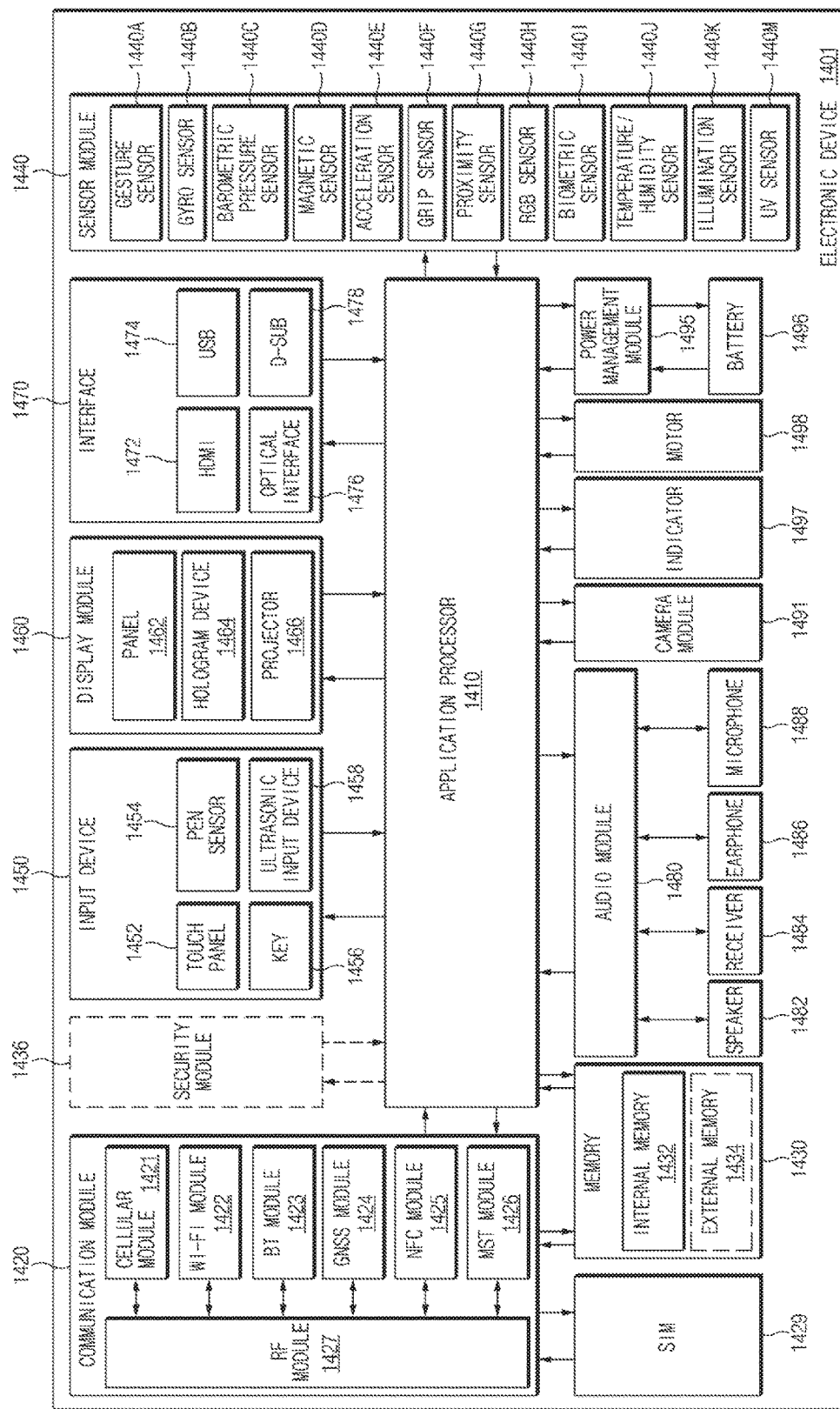
FIG. 14 is a block diagram illustrating an electronic device according to various embodiments of the present disclosure.

FIG. 14 is a block diagram 1401 illustrating an electronic device according to various embodiments of the present disclosure.

Referring to FIG. 14, an electronic device 1401, for example, may include all or part of the above-mentioned electronic device shown in FIG. 13. The electronic device 1401 may include at least one processor (for example, an AP 1410), a communication module 1420, a subscriber identification module (SIM) 1429, a memory 1430, a sensor module 1440, an input device 1450, a display 1460, an interface 1470, an audio module 1480, a camera module 1491, a power management module 1495, a battery 1496, an indicator 1497, and a motor 1498.

The processor 1410 may control a plurality of hardware or software components connected thereto and also may perform various data processing and operations by executing an OS or an application program. The processor 1410 may be implemented with a SoC, for example. According to an embodiment of the present disclosure, the processor 1410 may further include a graphics processing unit (GPU) (not shown) and/or an image signal processor (ISP). The processor 1410 may include at least part (for example, the cellular module 1421) of components shown in FIG. 14. The processor 1410 may load commands or data received from at least one of other components (for example, nonvolatile memory) and process them and may store various data in a nonvolatile memory.

The communication module 1420 may have the same or similar configuration to the communication module or communication interface of FIG. 13. The communication module 1420 may include a cellular module 1421, a Wi-Fi module 1422, a BT module 1423, a GNSS module 1424 (for example, a GPS module, a Glonass module, a Beidou module, or a Galileo module), an NFC module 1425, an MST module 1426, and a radio frequency (RF) module 1427.

The cellular module 1421, for example, may provide voice call, video call, text service, or Internet service through communication network. According to an embodiment of the present disclosure, the cellular module 1421 may perform a distinction and authentication operation on the electronic device 1401 in a communication network by using a SIM (for example, a SIM card) 1429. According to an embodiment of the present disclosure, the cellular module 1421 may perform at least part of a function that the processor 1410 provides. According to an embodiment of the present disclosure, the cellular module 1421 may further include a CP.

Each of the Wi-Fi module 1422, the BT module 1423, the GNSS module 1424, the NFC module 1425, and the MST module 1426 may include a processor for processing data transmitted/received through a corresponding module. According to an embodiment of the present disclosure, at least part (for example, two or more) of the cellular module 1421, the Wi-Fi module 1422, the BT module 1423, the GNSS module 1424, the NFC module 1425, and the MST module 1426 may be included in one integrated chip (IC) or IC package.

The RF module 1427, for example, may transmit/receive communication signals (for example, RF signals). The RF module 1427, for example, may include a transceiver, a power amp module (PAM), a frequency filter, a low noise amplifier (LNA), or an antenna. According to another embodiment of the present disclosure, at least one of the cellular module 1421, the Wi-Fi module 1422, the BT module 1423, the GNSS module, the NFC module 1425, and the MST module 1426 may transmit/receive RF signals through a separate RF module.

The SIM 1429, for example, may include a card including a SIM and/or an embedded SIM and also may include unique identification information (for example, an integrated circuit card identifier (ICCID)) or subscriber information (for example, an international mobile subscriber identity (IMSI)).

The memory 1430 (for example, the memory 1330) may include an internal memory 1432 or an external memory 1434. The internal memory 1432 may include at least one of a volatile memory (for example, dynamic random access memory (DRAM), static RAM (SRAM), synchronous dynamic RAM (SDRAM)) and a non-volatile memory (for example, one time programmable read only memory (OTPROM), programmable ROM (PROM), erasable and programmable ROM (EPROM), electrically erasable and programmable ROM (EEPROM), mask ROM, flash ROM, flash memory (for example, NAND flash memory or NOR flash memory), hard drive, or solid state drive (SSD)).

The external memory 1434 may further include flash drive, for example, compact flash (CF), secure digital (SD), micro-SD, mini-SD, extreme digital (xD), (multimediacard (MMC), or a memorystick. The external memory 1434 may be functionally and/or physically connected to the electronic device 1401 through various interfaces.

The security module 1436, as a module including a storage space having a relatively higher security level than the memory 1430, may be a circuit for securing safe data storage and protected execution environment. The security module 1436 may be implemented as a separate circuit and may include an additional processor. The security module 1436, for example, may be in a detachable smart chip or a SD card or may include an embedded secure element (eSE) embedded in a fixed chip of the electronic device 1401. Additionally, the security module 1436 may run on a different OS from the electronic device 1401. For example, the security module 1436 may run based on java card open platform (JCOP) OS.

The sensor module 1440 measures physical quantities or detects an operating state of the electronic device 1401, thereby converting the measured or detected information into electrical signals. The sensor module 1440 may include at least one of a gesture sensor 1440A, a gyro sensor 1440B, a barometric pressure sensor 1440C, a magnetic sensor 1440D, an acceleration sensor 1440E, a grip sensor 1440F, a proximity sensor 1440G, a color sensor 1440H (for example, a red, green, blue (RGB) sensor), a biometric sensor 1440I, a temperature/humidity sensor 1440J, an illumination sensor 1440K, and an ultra violet (UV) sensor 1440M. Additionally or alternatively, the sensor module 1440 may include an E-nose sensor, an electromyography (EMG) sensor, an electroencephalogram (EEG) sensor, an electrocardiogram (ECG) sensor, an infrared (IR) sensor, an iris sensor, or a fingerprint sensor. The sensor module 1440 may further include a control circuit for controlling at least one sensor therein. According to an embodiment of the present disclosure, the electronic device 1401 may further include a processor configured to control the sensor module 1440 as part of or separately from the processor 1410 and thus may control the sensor module 1440 while the processor 1410 is in a sleep state.

The input device 1450 may include a touch panel 1452, a (digital) pen sensor 1454, a key 1456, or an ultrasonic input device 1458. The touch panel 1452 may use at least one of capacitive, resistive, infrared, or ultrasonic methods, for example. Additionally, the touch panel 1452 may further include a control circuit. The touch panel 1452 may further include a tactile layer to provide tactile response to a user.

The (digital) pen sensor 1454, for example, may include a sheet for recognition as part of a touch panel or a separate sheet for recognition. The key 1456 may include a physical button, an optical key, or a keypad, for example. The ultrasonic input device 1458 may detect ultrasonic waves generated from an input tool through a microphone (for example, the microphone 1488) in order to check data corresponding to the detected ultrasonic waves.

The display 1460 (for example, the displays 160 and 1360) may include a panel 1462, a hologram device 1464, or a projector 1466. The panel 1462 may have the same or similar configuration to the display of FIG. 13. The panel 1462 may be implemented to be flexible, transparent, or wearable, for example. The panel 1462 and the touch panel 1452 may be configured with one module. The hologram device 1464 may show three-dimensional images in the air by using the interference of light. The projector 1466 may display an image by projecting light on a screen. The screen, for example, may be placed inside or outside the electronic device 1401. According to an embodiment of the present disclosure, the display 1460 may further include a control circuit for controlling the panel 1462, the hologram device 1464, or the projector 1466.

The interface 1470 may include a HDMI 1472, an USB 1474, an optical interface 1476, or a D-subminiature (D-sub) 1478, for example. The interface 1470, for example, may be included in the communication interface shown in FIG. 13. Additionally or alternatively, the interface 1470 may include a mobile high-definition link (MHL) interface, an SD card/MMC interface, or an infrared data association (IrDA) standard interface.

The audio module 1480 may convert sound into electrical signals and convert electrical signals into sounds. At least some components of the audio module 1480, for example, may be included in the input/output interface (or the user interface) shown in FIG. 13. The audio module 1480 may process sound information inputted/outputted through a speaker 1482, a receiver 1484, an earphone 1486, or a microphone 1488.

The camera module 1491, as a device for capturing a still image and a video, may include at least one image sensor (for example, a front sensor or a rear sensor), a lens (not shown), an ISP (not shown), or a flash (not shown) (for example, an LED or a xenon lamp).

The power management module 1495 may manage the power of the electronic device 1401. According to an embodiment of the present disclosure, the power management module 1495 may include a power management IC (PMIC), a charger IC, or a battery or fuel gauge, for example. The PMIC may have a wired and/or wireless charging method. As the wireless charging method, for example, there is a magnetic resonance method, a magnetic induction method, or an electromagnetic method. An additional circuit for wireless charging, for example, a circuit such as a coil loop, a resonant circuit, or a rectifier circuit, may be added. The battery gauge may measure the remaining amount of the battery 1496, or a voltage, current, or temperature thereof during charging. The battery 1496, for example, may include a rechargeable battery and/or a solar battery.

The indicator 1497 may display a specific state of the electronic device 1401 or part thereof (for example, the processor 1410), for example, a booting state, a message state, or a charging state. The motor 1498 may convert electrical signals into mechanical vibration and may generate vibration or haptic effect. Although not shown in the drawings, the electronic device 1401 may include a processing device (for example, a GPU) for mobile TV support. A processing device for mobile TV support may process media data according to the standards such as digital multimedia broadcasting (DMB), digital video broadcasting (DVB), or mediaFLO™.

Each of the above-mentioned components of the electronic device according to various embodiments of the present disclosure may be configured with at least one component and the name of a corresponding component may vary according to the kind of an electronic device. According to various embodiments of the present disclosure, an electronic device according to various embodiments of the present disclosure may include at least one of the above-mentioned components, may not include some of the above-mentioned components, or may further include another component. Additionally, some of components in an electronic device according to various embodiments of the present disclosure are configured as one entity, so that functions of previous corresponding components are performed identically.

Figure 15:
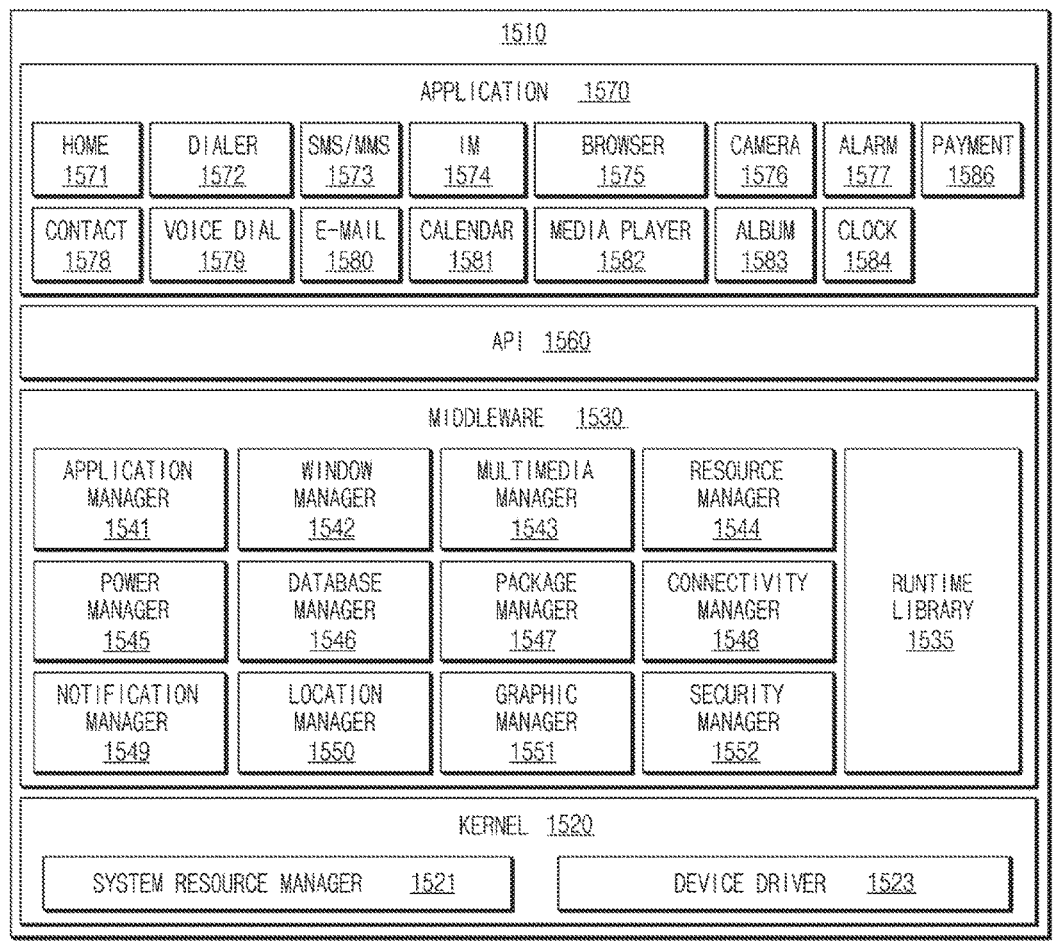
FIG. 15 is a block diagram illustrating a program module according to various embodiments of the present disclosure.

FIG. 15 is a block diagram illustrating a program module according to various embodiments of the present disclosure.

Referring to FIG. 15, according to an embodiment, the program module 1510 (for example, the program 1340) may include an OS for controlling a resource relating to an electronic device (for example, the electronic device 100, 200, 1301, or 1401) and/or various applications (for example, the application program 1570) running on the OS. The OS, for example, may include android, iOS, windows, symbian, tizen, or bada.

The program module 1510 may include a kernel 1520, a middleware 1530, an API 1560, and/or an application 1570. At least part of the program module 1510 may be preloaded on an electronic device or may be downloaded from an external electronic device (for example, the electronic device 1302 or 1304 or the server device 1306).

The kernel 1520 (for example, the kernel 1341), for example, may include a system resource manager 1521, or a device driver 1523. The system resource manager 1521 may perform the control, allocation, or retrieval of a system resource. According to an embodiment of the disclosure, the system resource manager 1521 may include a process management unit, a memory management unit, or a file system management unit. The device driver 1523, for example, may include a display driver, a camera driver, a BT driver, a sharing memory driver, a USB driver, a keypad driver, a Wi-Fi driver, an audio driver, or an inter-process communication (IPC) driver.

The middleware 1530, for example, may provide a function that the application 1570 requires commonly, or may provide various functions to the application 1570 through the API 1560 in order to allow the application 1570 to efficiently use a limited system resource inside the electronic device. According to an embodiment of the disclosure, the middleware 1530 (for example, the middleware 1343) may include at least one of a runtime library 1535, an application manager 1541, a window manager 1542, a multimedia manager 1543, a resource manager 1544, a power manager 1545, a database manager 1546, a package manager 1547, a connectivity manager 1548, a notification manager 1549, a location manager 1550, a graphic manager 1551, and a security manager 1552.

The runtime library 1535, for example, may include a library module that a complier uses to add a new function through a programming language while the application 1570 is running. The runtime library 1535 may perform a function on input/output management, memory management, or an arithmetic function.

The application manager 1541, for example, may mange the life cycle of at least one application among the applications 1570. The window manager 1542 may manage a graphical user interface (GUI) resource used in a screen. The multimedia manager 1543 may recognize a format for playing various media files and may encode or decode a media file by using the codec corresponding to a corresponding format. The resource manager 1544 may manage a resource such as a source code, a memory, or a storage space of at least any one of the applications 1570.

The power manager 1545, for example, may operate together with a basic input/output system (BIOS) to manage the battery or power and may provide power information necessary for an operation of the electronic device. The database manager 1546 may create, search, or modify a database used in at least one application among the applications 1570. The package manager 1547 may manage the installation or update of an application distributed in a package file format.

The connectivity manger 1548 may manage a wireless connection such as Wi-Fi or BT. The notification manager 1549 may display or notify an event such as arrival messages, appointments, and proximity alerts to a user in a manner of not interrupting the user. The location manager 1550 may manage location information on an electronic device. The graphic manager 1551 may manage a graphic effect to be provided to a user or a user interface relating thereto. The security manager 1552 may provide various security functions necessary for system security or user authentication. According to an embodiment of the present disclosure, when an electronic device (for example, the electronic devices 100, 1301, and 1401) includes a phone function, the middleware 1530 may further include a telephony manager for managing a voice or video call function of the electronic device.

The middleware 1530 may include a middleware module for forming a combination of various functions of the above-mentioned components. The middleware 1530 may provide a module specialized for each type of OS to provide differentiated functions. Additionally, the middleware 1530 may delete part of existing components or add new components dynamically.

The API 1560 (for example, the API 1345), for example, as a set of API programming functions, may be provided as another configuration according to OS. For example, in the case of android or iOS, one API set may be provided for each platform and in the case Tizen, at least two API sets may be provided for each platform.

The application 1570 (for example, the application program 1347) may include at least one application for providing functions such as a home 1571, a dialer 1572, a short message service (SMS)/multimedia messaging service (MMS) 1573, an instant message 1574, a browser 1575, a camera 1576, an alarm 1577, a contact 1578, a voice dial 1579, an e-mail 1580, a calendar 1581, a media player 1582, an album 1583, a clock 1584, a payment 1586, health care (for example, measure an exercise amount or blood sugar), or environmental information provision (for example, provide air pressure, humidity, or temperature information).

According to an embodiment, the application 1570 may include an application (hereinafter referred to as "information exchange application") for supporting information exchange between the electronic device (for example, the electronic device 100, 1301, or 1401) and an external electronic device (for example, the electronic device 1302 or 1304). The information exchange application, for example, may include a notification relay application for relaying specific information to the external device or a device management application for managing the external electronic device.

For example, the notification relay application may have a function for relaying to an external electronic device (for example, electronic device 1302 or 1304) notification information occurring from another application (for example, an SMS/MMS application, an e-mail application, a health care application, or an environmental information application) of the electronic device. Additionally, the notification relay application may receive notification information from an external electronic device and may then provide the received notification information to a user.

The device management application, for example, may manage (for example, install, delete, or update) at least one function (turn-on/turn off of the external electronic device itself (or some components) or the brightness (or resolution) adjustment of a display) of an external electronic device (for example, the electronic devices 1302 and 1304) communicating with the electronic device, an application operating in the external electronic device, or a service (for example, call service or message service) provided from the external device.

According to an embodiment of the disclosure, the application 1570 may include a specified application (for example, a health care application of a mobile medical device) according to the property of an external electronic device (for example, the electronic device 1302 or 1304). According to an embodiment, the application 1570 may include an application received from an external electronic device (for example, the server 1306 or the electronic device 1302 or 1304). According to an embodiment of the disclosure, the application 1570 may include a preloaded application or a third party application downloadable from a server. The names of components in the program module 1510 according to the shown embodiment may vary depending on the type of OS.

According to various embodiments of the present disclosure, at least part of the program module 1510 may be implemented with software, firmware, hardware, or a combination thereof. At least part of the program module 1510, for example, may be implemented (for example, executed) by a processor (for example, the processor 1320). At least part of the program module 1510 may include a module, a program, a routine, sets of instructions, or a process to perform at least one function, for example.

According to various embodiments of the present disclosure, according to a specified policy, collision occurring during a sharing content accessing process may be prevented.

Additionally, according to various embodiments of the present disclosure, by setting a device specific access authority, input information application of a device having a relatively high importance may not be interfered.

The term "module" used in various embodiments of the present disclosure, for example, may mean a unit including a combination of at least one of hardware, software, and firmware. The term "module" and the term "unit", "logic", "logical block", "component", or "circuit" may be interchangeably used. A "module" may be a minimum unit or part of an integrally configured component. A "module" may be a minimum unit performing at least one function or part thereof. A "module" may be implemented mechanically or electronically. For example, "module" according to various embodiments of the present disclosure may include at least one of an application-specific integrated circuit (ASIC) chip performing certain operations, field-programmable gate arrays (FPGAs), or a programmable-logic device, all of which are known or to be developed in the future.

According to various embodiments of the present disclosure, at least part of a device (for example, modules or functions thereof) or a method (for example, operations) according to this disclosure, for example, as in a form of a program module, may be implemented using an instruction stored in computer-readable storage media. When at least one processor executes an instruction, it may perform a function corresponding to the instruction. The non-transitory computer-readable storage media may include a memory, for example.

The non-transitory computer-readable storage media may include hard disks, floppy disks, magnetic media (for example, magnetic tape), optical media (for example, CD-ROM, and DVD), magneto-optical media (for example, floptical disk), and hardware devices (for example, ROM, RAM, or flash memory). Additionally, a program instruction may include high-level language code executable by a computer using an interpreter in addition to machine code created by a complier. The hardware device may be configured to operate as at least one software module to perform an operation of various embodiments of the present disclosure and vice versa.

A module or a program module according to various embodiments of the present disclosure may include at least one of the above-mentioned components, may not include some of the above-mentioned components, or may further include another component. Operations performed by a module, a program module, or other components according to various embodiments of the present disclosure may be executed through a sequential, parallel, repetitive or heuristic method. Additionally, some operations may be executed in a different order or may be omitted. Or, other operations may be added.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic device comprising:
    a display;
    an input interface configured to receive first input information which is related to a sharing content operation and inputted by a first user through the electronic device;
    a communication interface configured to receive second input information which is related to the sharing content operation from at least one external electronic device and inputted by a second user through the at least one external electronic device;
    a memory configured to store at least one instruction relating to processing of the sharing content; and
    a processor functionally connected to the input interface, the communication interface, and the memory,
    wherein the processor, upon executing the least one instruction, is configured to:
        determine collision occurrence possibility of the first input information and the second input information on the display; and
        output information for guiding collision occurrence possibility on the display, if there is a collision occurrence possibility.

2. The electronic device of claim 1, wherein the processor, upon executing the least one instruction, is configured to:
    calculate a first estimation area of the display relating to the first input information based on at least one of a progressing direction, progressing speed, and input size of the first input information;
    calculate a second estimation area of the display relating to the second input information based on at least one of a progressing direction, progressing speed, and input size of the second input information; and
    determine that there is collision occurrence possibility when at least a part of the first estimation area and at least a part of the second estimation area overlap.

3. The electronic device of claim 2, wherein the processor, upon executing the least one instruction, is configured to calculate the first estimation area or the second estimation area based on a stroke input or a movement of a specified object.

4. The electronic device of claim 2, wherein the processor, upon executing the least one instruction, is configured to, if it is determined that it is possible that the first estimation area and the second estimation area overlap each other, move an object corresponding to input information of the electronic device in a specified direction.

5. The electronic device of claim 2, wherein the processor, upon executing the least one instruction, is configured to:
    vary a size of the first estimation area corresponding to at least one of a progressing direction, progressing speed, and input size of the first input information; or
    vary a size of the second estimation area corresponding to at least one of a progressing direction, progressing speed, and input size of the second input information.

6. The electronic device of claim 1, wherein the processor, upon executing the least one instruction, is configured to allow the at least one external device to output at least one of visual information, audio information, and tactile information relating to an input limit of the electronic device or the at least one external device.

7. The electronic device of claim 1, wherein the processor, upon executing the least one instruction, is configured to:
    set an authority relating to the sharing content operation of at least one communication-connected device; and
    when there is the collision occurrence possibility, output lock information for limiting an input of the electronic device based on the sharing content operation authority to the at least one communication-connected device.

8. The electronic device of claim 7, wherein, upon executing the least one instruction, is configured to, if the collision occurrence possibility is released or removed, allow an output device to output lock release information for releasing an input limit.

9. The electronic device of claim 7, wherein the processor, upon executing the least one instruction, is configured to:

allocate device specific sharing content portion areas; and if there is collision occurrence possibility in a specified sharing content portion area, output the lock information to a device where a specified sharing content portion area is not allocated.

10. The electronic device of claim 1, wherein the processor, upon executing the least one instruction, is configured to:

allocate device specific sharing content portion areas;

set a collision determination area and a collision non-determination area among the sharing content portion areas;

process the collision occurrence possibility in correspondence to the first input information and the second input information occurring in the collision determination area; and when the collision occurrence possibility occurs in the collision non-determination area, ignore the collision occurrence possibility.

11. A sharing content operating method comprising:

collecting, by an electronic device, first input information inputted from by a first user through the electronic device in relation to a sharing content operation and second input information inputted by a second user through at least one external electronic device in relation to the sharing content operation;

determining, by the electronic device, whether a first object displayed on a display in correspondence to the first input information collides with a second object displayed on the display in correspondence to the second input information; and outputting information for guiding collision occurrence possibility on the display, if there is a collision occurrence possibility.

12. The method of claim 11, wherein the determining of whether the first object collides with the second object comprises:

calculating a first estimation area of the display relating to the first input information based on at least one of a progressing direction, progressing speed, and input size of the first input information;

calculating a second estimation area of the display relating to the second input information based on at least one of a progressing direction, progressing speed, and input size of the second input information; and when at least a part of the first estimation area and the second estimation area is overlapped, determining that there is collision occurrence possibility.

13. The method of claim 12, wherein the determining that there is the collision occurrence possibility comprises calculating the first estimation area or the second estimation area corresponding to a stroke input or calculating a first estimation area based on a movement of the first object or a second estimation area based on a movement of the second object.

14. The method of claim 12, wherein the determining that there is the collision occurrence possibility comprises:

varying a size of the first estimation area based on at least one of the progressing direction, progressing speed, and input size of the first input information; and varying a size of the second estimation area based on at least one of the progressing direction, progressing speed, and input size of the second input information.

15. The method of claim 11, wherein the outputting of the information for guiding collision occurrence possibility on the display comprises at least one of:

moving an object corresponding to input information relating to the electronic device in a specified direction; or allowing the at least one external device to output at least one of visual information, audio information, and tactile information relating to an input limit of the electronic device or the at least one external device.

16. The method of claim 11, further comprising setting a sharing content operation authority for each communication-connected device, wherein the outputting of the information for guiding collision occurrence possibility on the display comprises allowing the electronic device to output lock information for limiting an input of the electronic device based on the sharing content operation authority.

17. The method of claim 16, wherein the outputting of the information for guiding collision occurrence possibility on the display comprises, when the collision occurrence possibility is released or removed, outputting lock release information for releasing an input limit to a device for receiving the lock information.

18. The method of claim 11, further comprising allocating the device specific sharing content portion areas, wherein the outputting of the information for guiding collision occurrence possibility on the display comprises, if there is collision occurrence possibility in a specified sharing content portion area, outputting the lock information to a device where a specified sharing content portion area is not allocated.

\* \* \* \* \*